United States Patent [19]

Cameron et al.

[11] Patent Number: 5,627,762

[45] Date of Patent: *May 6, 1997

[54] COMPUTER IMPLEMENTED BALANCER

[75] Inventors: Wayne B. Cameron, Tonawanda; Roger J. Morella, Jr., East Aurora; Donald W. Davis, Tonawanda, all of N.Y.

[73] Assignee: Dynamics Research Corp., Tonawanda, N.Y.

[*] Notice: The term of this patent shall not extend beyond the expiration date of Pat. No. 5,412,583.

[21] Appl. No.: 377,154

[22] Filed: Jan. 24, 1995

Related U.S. Application Data

[62] Division of Ser. No. 75,178, Jun. 10, 1993, Pat. No. 5,412,583.

[51] Int. Cl.⁶ .................................................. G01N 1/38
[52] U.S. Cl. .......................... 364/508; 73/462; 364/463
[58] Field of Search .................................. 364/508, 463; 74/573 R; 73/66, 455, 457, 460, 462, 468, 570, 660

[56] References Cited

U.S. PATENT DOCUMENTS

| | | | |
|---|---|---|---|
| Re. 31,971 | 8/1985 | Gold | 73/462 |
| 4,064,704 | 12/1977 | Blackburn | 73/660 |
| 4,357,832 | 11/1982 | Blackburn et al. | 364/508 X |
| 4,457,172 | 7/1984 | Mathes et al. | 364/508 X |
| 4,475,393 | 10/1984 | Reutlinger | 73/462 |
| 4,480,471 | 11/1984 | Kogler et al. | 73/462 |
| 4,489,607 | 12/1984 | Park | 73/462 |
| 4,494,400 | 1/1985 | Hill | 73/462 |
| 4,535,411 | 8/1985 | Blackburn et al. | 73/462 X |
| 4,626,147 | 12/1986 | Nystven et al. | 364/508 X |
| 4,773,019 | 9/1988 | Martin et al. | 364/463 |
| 4,868,762 | 9/1989 | Grim et al. | 364/508 |
| 5,089,969 | 2/1992 | Bradshaw et al. | 364/463 |
| 5,099,430 | 3/1992 | Hirsch | 364/463 |
| 5,172,596 | 12/1992 | Rothamel et al. | 364/508 X |
| 5,214,585 | 5/1993 | Ehrich | 364/463 |
| 5,277,063 | 1/1994 | Thomas | 364/457 |
| 5,329,814 | 7/1994 | Betz et al. | 73/462 |
| 5,450,337 | 9/1995 | Chuan-Yuan et al. | 73/66 |

OTHER PUBLICATIONS

*Fundamentals of Balancing*, Schenck–Trebel, Apr. 1990.

Primary Examiner—Emanuel T. Voeltz
Assistant Examiner—Eric W. Stamber
Attorney, Agent, or Firm—Bean, Kauffman & Spencer

[57] ABSTRACT

A centrifugal balancer is combined with a computer system programed to suggest trial weights and placement and correction weights and placement to be used in interactive menu driven balancing sequences. Vibration responsive transducers provide inputs to automatic multi-gain amplifiers in a computer interface. The signals produced by the amplifiers are filtered by adjustable bandpass filters which are driven to match the rotational frequency of the work piece being balanced. Peak detectors rectify the output of the filters and an analog-to-digital converter processes the output of the peak detectors. A counter, reset by a sensor monitoring work piece rotation, is incremented until disabled by zero crossing detectors monitoring the outputs of the filters to provide relative phase information.

13 Claims, 19 Drawing Sheets

```
┌─────────────────────────────────────────────────────┐
│ ╔═════════════════════════════════════════════════╗ │
│ ║ COMPUTER BALANCING — Dynamic Research Corp.     ║ │
│ ║           Current Profile: none                 ║ │
│ ╚═════════════════════════════════════════════════╝ │
│ ┌──────────────── TWO PLANE BALANCE ──────────────┐ │
│ │                    Setup                        │ │
│ │   Rotor Weight:  50     Balancing Speed:  600   │ │
│ │                                                 │ │
│ │   Calibration Radius:                           │ │
│ │       Near Side: 14.3    Far Side:   8.2        │ │
│ │   Correction Radius:                            │ │
│ │       Near Side: 13.5    Far Side:   7.4        │ │
│ │                                                 │ │
│ │   Radius Units (In. or Cm.): inches             │ │
│ │                                                 │ │
│ │   Correction Weight Units (O/G/D): drill depth  │ │
│ │   Drill Weight Units (O/G): ounces              │ │
│ │   Depth Units (In. or Cm.): centimeters         │ │
│ │   Weight/Depth RAtio (ounces per cm.):   2      │ │
│ └─────────────────────────────────────────────────┘ │
│            Is This Correct (Y/N) ?                  │
└─────────────────────────────────────────────────────┘
```

Fig. 7

```
┌─────────────────────────────────────────────────────┐
│ ╔═════════════════════════════════════════════════╗ │
│ ║ COMPUTER BALANCING — Dynamic Research Corp.     ║ │
│ ║           Current Profile: none                 ║ │
│ ╚═════════════════════════════════════════════════╝ │
│ ┌──────────────── FORCE BALANCE ──────────────────┐ │
│ │                    Setup                        │ │
│ │   Rotor Weight:  50     Balancing Speed:  600   │ │
│ │                                                 │ │
│ │   Calibration Radius:   14.3                    │ │
│ │                                                 │ │
│ │   Correction Radius     13.5                    │ │
│ │                                                 │ │
│ │                                                 │ │
│ │   Radius Units (In. or Cm.): inches             │ │
│ │                                                 │ │
│ │   Correction Weight Units (O/G/D): drill depth  │ │
│ │   Drill Weight Units (O/G): ounces              │ │
│ │   Depth Units (In. or Cm.): centimeters         │ │
│ │   Weight/Depth RAtio (ounces per cm.):   2      │ │
│ └─────────────────────────────────────────────────┘ │
│            Is This Correct (Y/N) ?                  │
└─────────────────────────────────────────────────────┘
```

Fig. 8

```
COMPUTER BALANCING — Dynamic Research Corp.
Current Profile: none
```

SINGLE PLANE BALANCE — NEAR SIDE SENSOR

Calibration Setup

SUGGESTED CALIBRATION WEIGHT

Add a weight of 1.33 ounces (37.7 grams)
to the near side of the rotor at approximately
319 degrees at a radius of 4.3 inches Calibration Weight:   1.33

Speed is   600 RPM

Enter the actual calibration weight added to the rotor.

Fig. 14

```
COMPUTER BALANCING — Dynamic Research Corp.
Current Profile: none
```

SINGLE PLANE BALANCE — NEAR SIDE SENSOR

Calibration Setup

SUGGESTED CALIBRATION WEIGHT

Add a weight of 1.33 ounces (37.7 grams)
to the near side of the rotor at approximately
319 degrees at a radius of 4.3 inches Calibration Weight:   1.33
Calibration Weight Angle:   319

Speed is   600 RPM

Enter the actual calibration weight added to the rotor.

Fig. 15

```
COMPUTER BALANCING — Dynamic Research Corp.
Current Profile: none
```

SINGLE PLANE BALANCE — NEAR SIDE SENSOR

Calibration Setup

SUGGESTED CALIBRATION WEIGHT

Add a weight of 1.33 ounces (37.7 grams)
to the near side of the rotor at approximately
319 degrees at a radius of 4.3 inches Calibration Weight is 1.33 ounces
at 4.3 inches located at 319 Degrees Speed is 600 RPM Is This Correct (Y/N) ?

Fig. 16

```
COMPUTER BALANCING — Dynamic Research Corp.
Current Profile: none
```

SINGLE PLANE BALANCE — NEAR SIDE SENSOR

Calibration Readings

Waiting to Reach Balance Speed of 600 RPM

Speed is 600 RPM

Fig. 18

```
┌─────────────────────────────────────────────────────┐
│ ┌─────────────────────────────────────────────────┐ │
│ │  COMPUTER BALANCING - Dynamic Research Corp.    │ │
│ │           Current Profile: none                 │ │
│ └─────────────────────────────────────────────────┘ │
│  ┌─ SINGLE PLANE BALANCE - NEAR SIDE SENSOR ─────┐  │
│  │            Calibration Readings               │  │
│  │                                               │  │
│  │    Remove Calibration Weight From Near Side   │  │
│  │                                               │  │
│  │                     and                       │  │
│  │                                               │  │
│  │             Hit Any Key When Ready            │  │
│  │                                               │  │
│  │                                               │  │
│  │            ┌──────────────────────┐           │  │
│  │            │   Speed is  600 RPM  │           │  │
│  │            └──────────────────────┘           │  │
│  └───────────────────────────────────────────────┘  │
└─────────────────────────────────────────────────────┘
```

Fig. 21

```
┌─────────────────────────────────────────────────────┐
│ ┌─────────────────────────────────────────────────┐ │
│ │  COMPUTER BALANCING - Dynamic Research Corp.    │ │
│ │           Current Profile: none                 │ │
│ └─────────────────────────────────────────────────┘ │
│  ┌─ SINGLE PLANE BALANCE - NEAR SIDE SENSOR ─────┐  │
│  │   ┌───────────────────────────────────────┐   │  │
│  │   │          Correction Values            │   │  │
│  │   │  DRILL      945.53 cm.    at 321 Deg. │   │  │
│  │   │                                       │   │  │
│  │   │  UNBALANCE    3876.6833 oz-in         │   │  │
│  │   │              %109903.9766 gm-in       │   │  │
│  │   └───────────────────────────────────────┘   │  │
│  │                                               │  │
│  │     ┌─────────────────────────────────┐       │  │
│  │     │ Vibration  28.835    (mils)     │       │  │
│  │     │ Angle        141     (degrees)  │       │  │
│  │     └─────────────────────────────────┘       │  │
│  │                                               │  │
│  │            ┌──────────────────────┐           │  │
│  │            │   Speed is  600 RPM  │           │  │
│  │            └──────────────────────┘           │  │
│  └───────────────────────────────────────────────┘  │
│ 1)Trim Piece  2)Next Piece  3)Report  4)Setup  5)Store Profile  6)Main │
└─────────────────────────────────────────────────────┘
```

Fig. 23

Jones Electric Motor Co., Inc.
1234 Any Street
P.O. Box 678
Yourtown, NY 12345
(800) 123-4567

BALANCE REPORT

Date: 06-09-1993
Job: 12345
Operator: Jose #345

Balance Speed:   600 RPM

Half Key Weight:
  Near Side = 57 grams          Far Side = 68 grams

Near Side = long shaft end    Far Side = short shaft end

Initial Unbalance
    Near Vibration:    5.67 mils at 345 degrees
    Near Unbalance:    2.4682 oz-in or 69.9721 gm-in Far Vibration:     7.21 mils at 127 degrees
    Far Unbalance:     0.9341 oz-in or 26.4825 gm-in Finish Unbalance
    Near Vibration:    0.21 mils at 324 degrees
    Near Unbalance:    0.0902 oz-in or 2.5572 gm-in Far Vibration:     0.19 mils at 156 degrees
    Far Unbalance:     0.0649 oz-in or 1.8398 gm-in Weight
Near:     23.32 grams or 0.82 ounces
Far:      8.83 grams or 0.31 ounces This unit has been precision balanced using our State-of-the-Art Dynamics Research Corp. Computer Balancer

Fig. 25

COMPUTER IMPLEMENTED BALANCER

RELATED U.S. PATENT DATA

This is a division of U.S. patent application Ser. No. 08/075,178, filed Jun. 10, 1993, now U.S. Pat. No. 5,412,583.

FIELD OF THE INVENTION

The present invention relates to a method for correcting unbalance of a rotating mass. More particularly, it relates to a method wherein unbalance of a rotating body (rotor) is corrected by either adding, or subtracting by machining, corrective weights. The position and the magnitude of the corrective weight required is determined using a microprocessor aided shaft synchronous averaging technique.

DESCRIPTION OF THE PRIOR ART

Unbalance is the most common cause of vibration in rotating machinery. Some 80% of vibration problems in machinery are associated with unbalance.

Unbalance causes the rotating part to wobble instead of spinning smoothly. This produces a vibration with a frequency equal to the RPM of the part and amplitude proportional to the amount of unbalance. The greater the unbalance, the greater the displacement of the vibration.

Balancing a rotating part consists of locating the heavy spot on the rotor, and adding an equal weight to the opposite side or removing a weight from the heavy side. It makes no difference whether you add or remove weight. The idea is to get equal distribution of weight around the rotating center line.

Contemporary measuring equipment permits unbalance to be reduced to low limits. However, achieving satisfactory results with available equipment requires the use of trained, highly skilled operators to determine to what extent the unbalance must be reduced, the amount of mass correction required, replacement of the correction and where the economic and technical compromise on balance quality lies.

The foregoing problems are addressed by numerous prior art systems which employ static and/or centrifugal balancing. The more effective is usually a centrifugal balancing technique employing a shaft synchronous averaging approach which in recent years has been simplified from an operator standpoint through the use of personal computers or the more costly addition of dedicated microprocessors to balancing systems. In such systems, contacting pick-up is utilized as a reference device to measure vibrations generated by the rotor. The vibration data is correlated with the rotation of the mass to provide an indication of where corrective weight adjustment is required. Next, trial weight adjustments are made until optimum centrifugal balance is achieved. This a time consuming, labor intensive operation even when aided by known computer technology.

Examples of computer aided balancing and other prior balancing techniques may be found in the Schenck Trebel publication "Fundamentals of Balancing" published in April 1990 which is incorporated herein by reference.

A specific example of balancing using trial weights combined with a dedicated microprocessor driven system is presented by U.S. Pat. No. 4,535,411 on "Field Balancing Apparatus" issued to B. Blackburn, et al. This system simplifies the operators task by providing prompts on a display means which leads the user through a series of trial runs and requires operator selection of a vibration profile deemed by the operator as being representative of the optimum transducer output representing the unbalance. This selection process includes tuning filters to their optimum frequency for the work piece. The manual functions demand a skilled, experienced operator and are the source of time consuming, costly delays as well as inaccuracies in the final balance. These problems are magnified by a requirement to perform a trial run without correction followed by a trial run with a trial weight at 0 degrees which is followed by a calculation that provides an offset angle from zero degrees for balance correction but no radial location and a correction weight as a function of the original trial weight.

In some prior art systems balancing is accomplished without the use of trial weights. U.S. Pat. No. 4,357,832 on "Digital Electronic Balancing Apparatus" issued to B. Blackburn, et al is an example of such a system. It obtains vibrational characteristics of the rotor by vibrating the rotor bearing supports at a known frequency during a trial run. Such systems have many disadvantages, not the least of which is errors introduced by variations in the effects of the vibrators resulting from variables related to the balance system per se and/or the work piece.

U.S. Pat. No. 5,089,969 on "Shaft Synchronous Balancing Apparatus" issued to C. Bradshaw et al. is an example of synchronous balancing using a general purpose computer. In this system the mass to be balanced is rotated at a known rate and transducers provide vibration responsive output signals relative to selected balance planes as in the Blackburn, et al devices of the prior discussions. The transducers are incrementally sampled based upon the phase information derived from a rotational monitoring device. The data is digitized and manipulated with the aid of a computer of the type usually referred to as a personal computer or PC. The microprocessor in the device runs a routine which averages the data falling within predetermined limits and develops offset corrections. This system requires the operator to select a gain adjustment from a plurality of available preset values, a process that can lead to corrupted data and faulty balancing. This system has the further disadvantage of incorporating the problems of Blackburn, et al '832 and '411 discussed above.

Prior balancing systems which use a filter employ a fixed frequency filter or one that is tuned by hand using trial and error methods or a strobe light to synchronize the filter with the operating speed. They do not track the speed and account for speed variations therefore providing less accurate displacement and phase readings.

OBJECTIVES OF THE INVENTION

The primary objective of the present invention is to enhance computer aided balancing by providing a method where an operator is guided through the balancing operation and provided with the mass for optimum trial weights and their placement.

Another objective of the invention is to provide a balancing method wherein the initial trial run data is stored and recallable for use with identical work pieces.

A further objective of the present invention is to provide a balancing system which provides a printed report listing the pertinent balancing parameters.

Another objective of the invention is to provide a system where the speed of rotation of the rotor may be commanded to a predetermined optimum balancing speed for the work piece combined with a method whereby all subsequent runs of the work piece occur at an identical speed and measurements are inhibited until the work piece achieves the set speed.

Another objective of the invention is to provide a means for balancing which includes calculating a suggested trial weight to be used during the setup procedure based on the mass of the work piece and its unbalance characteristics.

A still further objective of the invention is to provide interactive menu driven computer monitor screen displays instructing the operator of each step to be performed when balancing or storing balance data.

Another objective is to provide alternate forms of balancing, including Single Plane, Two Plane, Force and manual balancing.

A further objective is to provide balancing routines using operator selectable units including weight units in ounces, grams or drill depth with drill depth measured in inches or centimeters and radius location in inches or centimeters.

Another objective of the invention is to provide multilingual screen prompts wherein the language is user selectable.

Another objective is to filter the vibration data with an adjustable filter which tracks the rotational frequency of the work piece being balanced.

Another objective is to provide an electronic interface between a centrifugal balance machine of the type which incorporates rotation position sensors and vibration sensors and a personal computer.

A still further objective is to provide a balancing system including means to run the complete balancing routines for all selectable balancing operations without turning the work piece.

Another objective is to provide a vibration signal processing filter which is tuned by a signal produced by a phase sensor which tracks the frequency of the work piece.

A still further objective is to provide a suggested weight to use during a setup procedure based on the weight of the work piece and the vibration induced displacement of the work supports.

Another objective of the system is to provide a means for splitting a correction weight between two correction points.

A further objective is to provide routines to record the actual time required to balance and report the data directly to an automated accounting system for billing purposes.

SUMMARY OF THE INVENTION

A centrifugal balancer using hard or soft bearings is combined with a computer system programed to suggest trial weights and placement and correction weights and placement. The computer runs an interactive menu driven program including a plurality of centrifugal balancing sequences. Vibration responsive transducers provide analog signals representing the magnitude of vibration in the load bearing planes of the work piece. These signals are input to automatic multi-gain amplifiers in a computer interface. The outputs of the amplifiers are filtered by bandpass filters which track the rotational frequency of the work piece. Peak detectors rectify the outputs of the filters and an analog-to-digital converter processes the outputs of the peak detectors. A counter, reset by a zero crossing detector responsive to a mark sensing transducer, is incremented until disabled by zero crossing detectors monitoring the output of the filters. The data produced by the analog-to-digital converter and counter are supplied to the computer for manipulation by the algorithms producing weight and placement data. Readings obtained from a rotation sensor responsive to the output of the mark sensor are processed via a standard deviation routine where they are averaged and then compared to previous data to determine stability. Once the readings are stabilized, indicating that the RPM of the work piece has stabilized at the target speed, the system calculates weight correction and placement for Single Plane, Two Plane, Force or manual balancing modes.

The interactive menu driven program directs the balance system operator through the steps required to input data which it uses in calculating the mass and placement of a trial weight. The program sequences through routines which perform Single and Two Plane Balancing, Force Balancing and manual Balancing. The routines provide computer displays in the form of menu driven screens which require operator input to verify data and perform mechanical tasks related to the balancing process. In addition, the program directs the formulation of reports on the balancing process, prints the reports, and stores balance data to be used to simplify balancing of duplicate work pieces.

BRIEF DESCRIPTION OF THE DRAWINGS

FIG. 7 illustrates the screen containing the menu driven sequences required to set up for Two Plane Balancing.

FIG. 8 illustrates the screen containing the menu driven sequences required to set up for Force Balancing.

FIG. 14 illustrates the calibration set up screen as it is presented to an operator after samples have been taken and evaluated and requesting verification of acceptance of a suggested trial weight.

FIG. 15 is a calibration set up screen requesting the operator to verify the calibration weight angle.

FIG. 16 is a facsimile of a calibration set up screen requesting verification of the calibration set up.

FIG. 18 is a facsimile of the notice provided to the operator that the program is waiting for the machine to reach balance speed.

FIG. 21 illustrates a facsimile of the screen instructing the operator to remove calibration weights and inform the computer that the weight has been removed.

FIG. 23 is the final correction screen created by the logic illustrated in FIG. 22 presenting the correction values in terms of drill depth and drill location and instructing the operator to select a branching subroutine.

FIG. 25 is exemplary of a balance report prepared automatically by the system in response to the operator selecting the report subroutine.

DETAILED DESCRIPTION

This invention is comprised of a centrifugal balancing machine, such as described in the Schenck Trebel publication "Fundamentals of Balancing" published in April 1990, which is provided with a transducer at each work piece support bearing for sensing the vibration frequency and amplitude of the rotating work piece or rotor. The machine includes a means to sense each revolution of the rotor. Signals from the transducers and rotation sensing means are processed by circuitry adapted to convert the analog output of the transducers on any centrifugal balancer to digital data representing vibration magnitude with a phase relationship to work piece rotation. The data serve as an input to a conventional computer such as a personal computer or PC. The PC is driven by software which, when combined with special purpose hardware, forms the basis for this invention.

Figure 1:
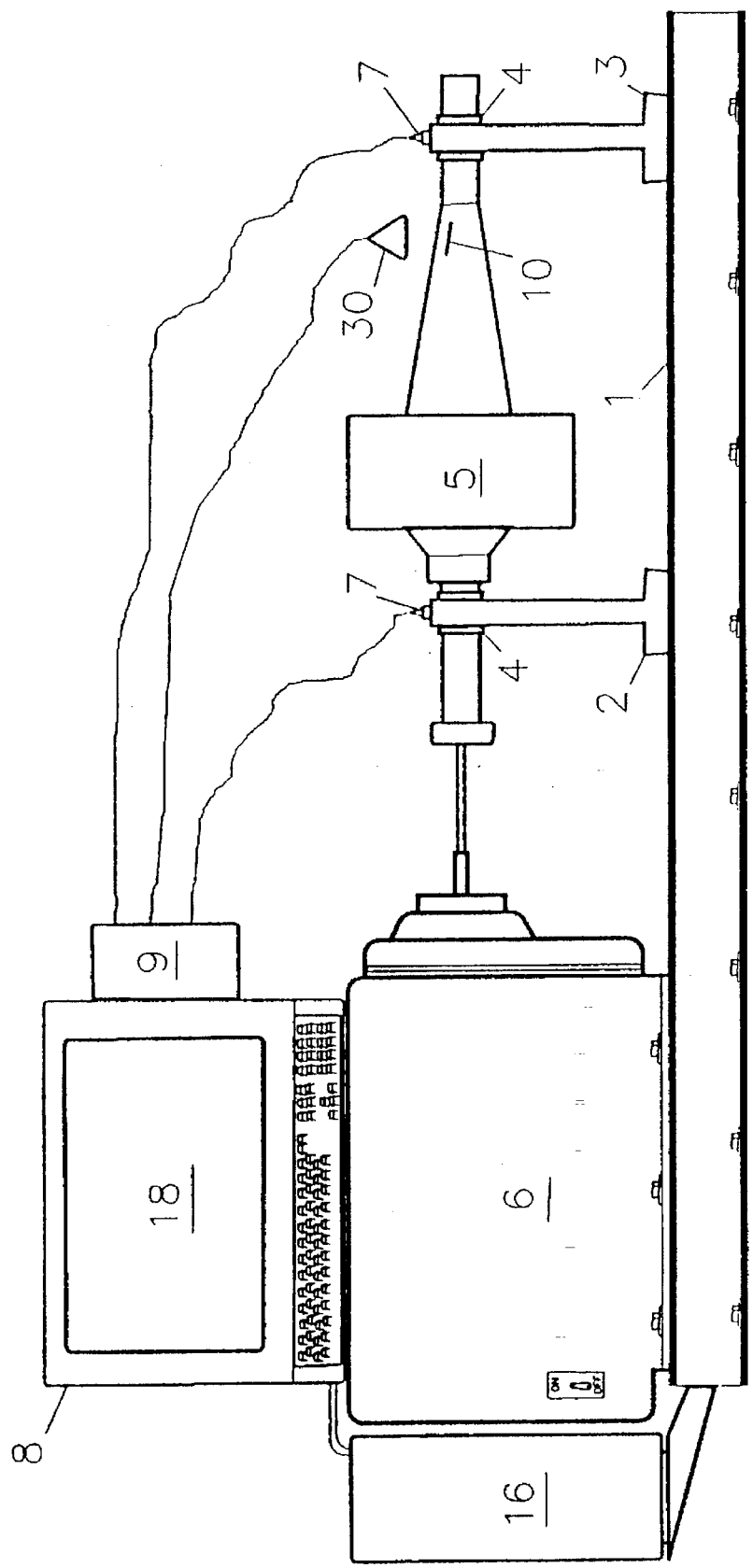
FIG. 1 illustrates the component parts which form the balancing system and their interconnections.

In the preferred embodiment, the balancer, FIG. 1, consists of a bed or base, 1, two upright supports, one fixed, 2, and one movable, 3, to adjust for different center distance between bearing surfaces, 4, of the work piece, 5, and a drive system, 6, consisting of a variable speed motor, drive pulley, idler pulleys, flat belt, and tensioning device. For larger work pieces, two beds may be combined to allow for unlimited length of the work piece. In such configurations, one upright support is placed on one bed and one on the other.

The upright supports house a flexible support system for the anti-friction roller bearing assemblies which support the work piece while it is rotated in the machine. The flexible supports are designed to provide a low natural frequency (usually under 2 hz). In the trade this is referred to as a "Soft Bearing Balancer" because it operates at a frequency above that of the first critical or natural frequency of the support system. However, the invention presented by this patent may be used with equal success in "Hard Bearing Balancers".

In a soft bearing machine, when the work piece is rotated above the first critical frequency of the support system, the displacement of the work supports is proportional to the unbalance in the work piece. Multiplying the weight of the work piece supported by the bearing support assemblies, plus the parasitic mass of the supports, in ounces, times this displacement in inches, will produce an answer equal to the unbalance in ounce-inches which can be represented by a given weight in ounces operating or attached to the work piece at a given radius (inches) from the rotating center of the work piece. The present invention has the capability via algorithms driven by the software to work in either U.S. units of inches and ounces or metric units or mix the two. The angular position of the unbalance is at a point relative to the peak of the displacement of the work supports during each revolution.

The machine utilizes two direct prod velocity pick-ups, 7, to measure the excursion of the work supports. The pickups consist of a fixed coil with a magnet supported within the coil which is attached to a shaft which is attached to the work piece support utilizing another magnet. When the work piece support moves, it moves the magnet within the coil, thereby producing a voltage which is proportional to the velocity of the magnet (and the work piece). This signal is sent to the computer, 8, via an electronic interface, 9, which is illustrated in greater detail in FIG. 2. The signal is integrated, 12 or 22 of FIG. 2, to produce a signal which is proportional to the peak-to-peak displacement of the work piece.

The velocity pick-ups (Transducers) have a sensitivity of 250 mv./inch/second (peak). The signal produced by unbalance is equal in frequency to the RPM of the work piece The RPM of the work piece is accurately determine via an optical sensor which incorporates a fiber-optic sensing device. Integrating the signal prior to filtering provides a signal amplification which increases the sensitivity and accuracy of the balance. Lower frequencies are amplified to a greater extent than high frequencies by the integrator. Because balancing is accomplished at a low frequency (RPM) and much of the electronic noise with the signal is at 60 hz and above, integrating increases the signal-to-noise ratio. This aids in increasing the sensitivity of the balancing machine and its accuracy.

The displacement readings are taken several times and averaged. This procedure is repeated and the two averages are compared. If they agree with each other within a predetermined tolerance, the reading is accepted and used in the calculations. if they do not agree, the readings are thrown out and the process is repeated until accurate measurements are obtained. This unique process is superior to the prior art, wherein an operator takes a sample of the data during one cycle by depressing a "Capture and Hold" switch. Other methods require the operator to obtain displacement (amount) and phase readings using a strobe light or other method and manually inputting this data to the computer program.

Figure 2:
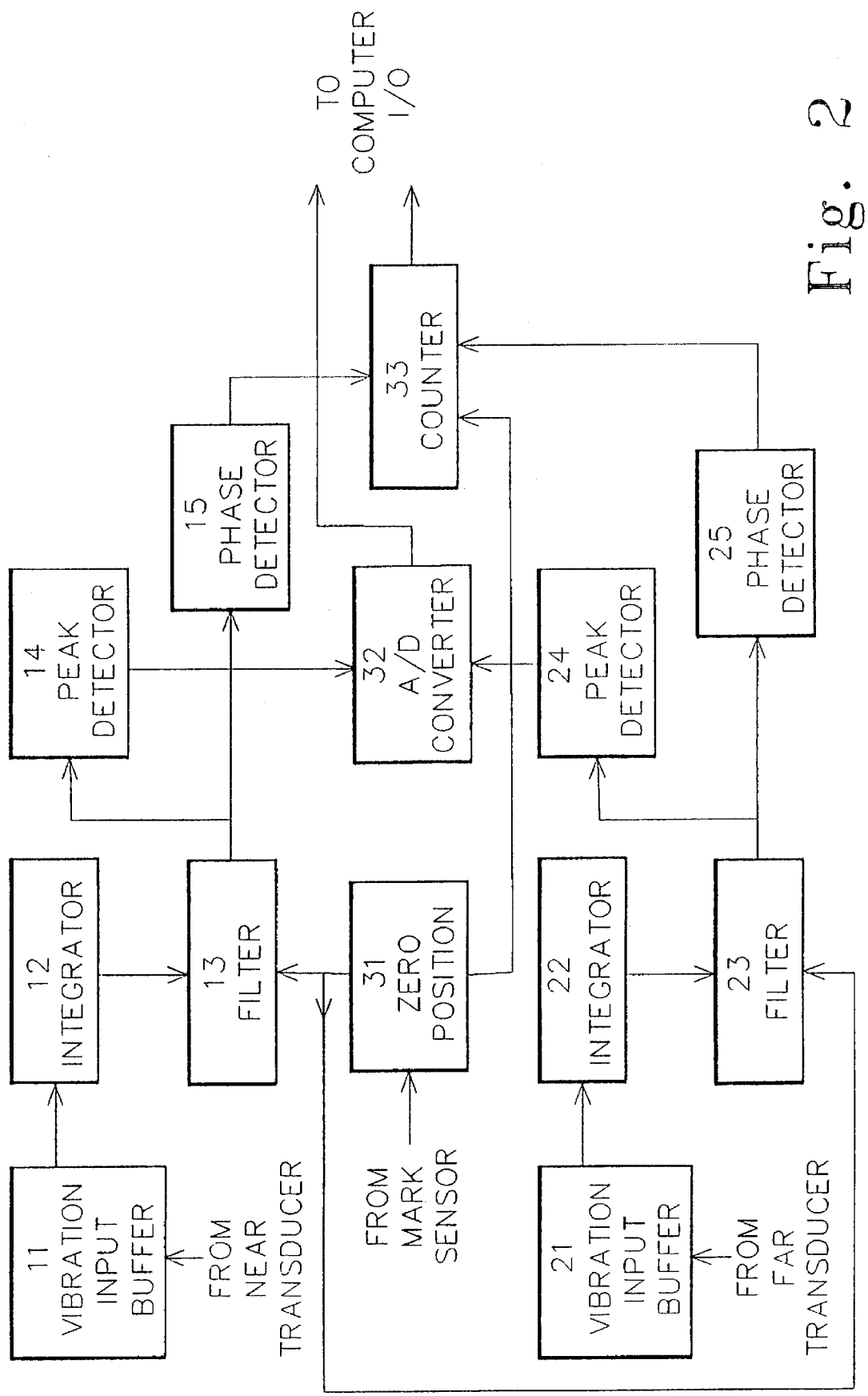
FIG. 2 is a detailed block diagram of the electronic interface, 9 of FIG. 1, between the transducer and sensor adapted to monitor a work piece during balancing and the computer.

After integrating, the signal is filtered using a tracking, digital type, bandpass, high Q, filter, 13 or 23 of FIG. 2. A phase sensing device, 31, is used to trigger a phase-lock-loop which tunes the filter. The filter eliminates unwanted frequencies in the raw signal thereby increasing the accuracy of the displacement readings. The filter, because it is tuned by the signal produced by the phase sensor via the phase-lock-loop, tracks the frequency of the work piece in spite of minor speed changes. This allows the "Q" or sharpness of the filter to be very high without worry of the speed changing and having the filter distorting or attenuating the signal by being mistuned to the operating frequency. Prior systems use a filter that is tuned by hand using a strobe light to synchronize the filter with the operating speed. They do not track the speed and account for speed variations therefore providing less accurate displacement and phase readings.

Work piece rotation is tracked by placing a reference mark, 10 of FIG. 1, typically a piece of reflective tape, on the work piece, 5. When the reference mark passes the fiber optic sensor, 30, it causes a positive electronic pulse to be generated. This pulse represents the 0 degree reference point. The computer divides the time during one revolution of the work piece (between the pulses) into 360 parts representing 360 degrees. The 0 cross over point of the sinusoidal wave of the pick-up signal is compared to this timing function and the "Relative phase angle" of the signal is established. Because the displacement signal, which was obtained through integration, is 90 degrees ahead of the original "Velocity" signal produced by the pick-ups, this angle (90) is subtracted from the indicated angle to provide an approximate true angle of the unbalance relative to the mark, 10, that was placed on the shaft. To attain the maximum accuracy in reading this angle, the same averaging method used to determine the displacement of the work piece is used. Accurate phase measurements are essential in accurately calculating the amount of unbalance and cross effect using vector summation. Other systems use a "sample and hold" procedure when they obtain this data which is not as accurate. This system can read the angle within 1 degree. Other methods under similar conditions using a strobe light or the sample and hold method, rely on the operators skill and are only accurate to 5 to 10 degrees.

FIG. 2 is a block diagram of the electronic interface circuitry, 9 of FIG. 1, used in a preferred embodiment of the invention to create the data required by the computer 8 from the balancing machine transducers 4 and rotation sensor 30. The circuitry measures analog signals and translates these signals into digital data which is read into the computer and analyzed to accomplish balancing. The circuit includes two identical input channels, one for near and one for far side plane vibration displacement, a phase detector, and an analog-to-digital converter and a counter which serve as amplitude and phase input means to the computer.

The vibration signals for the near and far sides originate from velocity type transducers and are input into the circuit through the vibration input buffers 11 and 21. The buffers include automatic multi-gain amplifiers which amplify the signals according to their dc level. The buffers are identical but one contains an additional switching means which channels the near and far side inputs to the same channel during Force Balancing.

The output from the multi-gain amplifiers of the input buffers 11 and 21 are applied to their respective integrator 12 or 22. In the preferred embodiment, each integrator translates the signal into its displacement equivalent. The integrators have a switch which discharges a storage capacitor during gain switching to keep the integrator op amp from going into saturation, thus eliminating excess settling delays during gain switching. The displacement signal is then routed through a variable digital filter circuit, 13 or 23, to minimize the effects of noise and non-relevant vibrations. The digital filter has a very narrow bandwidth and a center frequency that is derived from the zero position trigger source through the zero position circuit 31. This ensures that the filter's center frequency is the same as the rotational frequency of the part being balanced. The input to the zero position circuit, the zero position trigger source, is an optical mark sensor in the preferred embodiment. The optical sensor detects a strobe mark which is placed on the edge of the rotor before setup. All radial references are relative to the strobe mark.

The displacement signal from the filters is applied to two circuits, a peak detector circuit, 14 or 24, for measuring maximum vibration level and a zero crossing circuit, phase detector 15 or 25, for measuring signal phase. The peak detector circuit rectifies the ac displacement signal and filters it through a capacitive filter. A switch across the filter capacitor discharges the capacitor gain switching. The switch is responsive to the same control input as the switch in the same channel integrator circuit.

The DC level measured across the capacitor of the peak detector represents the peak vibration of the rotating part. This DC level is converted to a digital data signal by an analog-to-digital converter, 32, before being read into the computer through a digital port. This digital data represents the maximum vibration excursions at the balance plane. The input to the A/D converter, 32, is controlled by a switch which determines whether the input is from the near channel circuits or from the far channel circuits.

The phase signal is determined by first measuring the number of counts it takes for the part to make one revolution. This is done by starting and stopping a digital counter comprised of a pair of registers incremented by a clock pulse generator in the counter 33 using a mark placed on the rotating shaft and a sensor to act as a trigger as previously described. The speed of rotation is determined by comparing the number of counts measured during a revolution to the counter's calibrated clock frequency which can be varied depending on the required rotational speed range of the machine. The phase count is measured by starting the counter with the phase trigger and stopping the counter when the vibration signal phase is at zero degrees as detected by a zero crossing detector in each of the phase detectors, 15 and 25. This is accomplished by a control input to the counter from a zero crossing circuit in the zero position circuit 31. The same side select switch which determines the path to the A/D circuit is used here to determine which zero crossing signal (near or far) stops the counter. The phase is determined by the computer which divides the number of counts measured for one entire revolution by the number of counts measured from start to zero degrees.

The signals converted to their digital equivalents by the circuits depicted in FIG. 2 are read into the computer via standard digital interface ports which are used for data transfer and control.

After the raw data enters computer, it is analyzed to determine that the vibration amplitude and phase readings are stable. The vibration levels are read into the computer in a data set of multiple readings and run through a standard deviation routine which discards the readings which fall outside the standard deviation for that data set. The remaining readings are averaged and compared to previous data sets to determine the stability of the readings. This is repeated until the stability of the readings are acceptable or until the software times out.

The phase readings are measured in a similar manner to the vibration readings. The phase data sets are run through a standard deviation routine which discards the readings which fall outside the standard deviation of the set. The remaining readings are averaged and compared to the previous data sets to determine reading stability. This is repeated until the stability of the readings is acceptable or until the software times out.

In the case of both the vibration and phase readings, the operator has the option to accept any readings manually that have not settled within a reasonable amount of time.

The machine is multi-lingual via its program which includes instructions for producing all display screens in a selected one of a variety of different languages. The operator can choose the language with which he operates.

The machine can establish a proper tolerance to which the work piece should be balanced based on standards such as, Mil STD 167, I.S.O. (International Standards Organization) 1940, American Petroleum Institute (A.P.I.) standards and others using mathematical equations and provide a hard copy printout via the printer 16 of FIG. 1 of the balancing operation and resultant corrections. The report format can be tailor made to customers requirements, including printing the report in any language desired. The basic report consists of: operators name, date of balance, speed of balance, starting unbalance preset, finish balance in ounce-inches, mils, gram-inches or other weight units. The report also shows weight of half keys used. The report can be printed or saved on a disk for future reference.

The computer screen displays the amount and angle as to where to add weight and where to subtract weight simultaneously.

The system can be set up to read drill depth corrections based on the weight of material per cubic inch.

It can readout in correction units of: ounces, grams, drill depth, or any other correction unit the user desires.

The computer does all of the data acquisition without aid of the operator. It sets it's own gain, samples and averages, and records the data. It is also self instructional.

The system uses "Direct Prod" velocity pick-ups to allow balancing at low speeds. The system typically balances at 300 RPM while others must spin the part much faster (800 to 900 RPM) due to the non-linearity of the "seismic type" velocity pick-ups which they use.

The system calculates a suggested weight to use during the setup procedure (For a Trial Weight) based on the weight of the work piece and the displacement of the work supports. This is critical but not done by other systems. Too little weight will produce inaccurate vector solutions. Too much weight can be dangerous to the operator or people stationed nearby and/or cause damage to the work piece The system is also capable of splitting a correction weight between two correction points. This problem occurs when the program calls for weight to be added for instance between two blades of a fan.

The software includes routines to record the actual time required to balance and report the data directly to an automated accounting system for billing purposes.

FIGS. 3 through 29 illustrate, through the use of logic flow charts and facsimiles of the menu driven instruction displays created by system, the methods employed by the present invention to achieve balancing.

Figure 3:
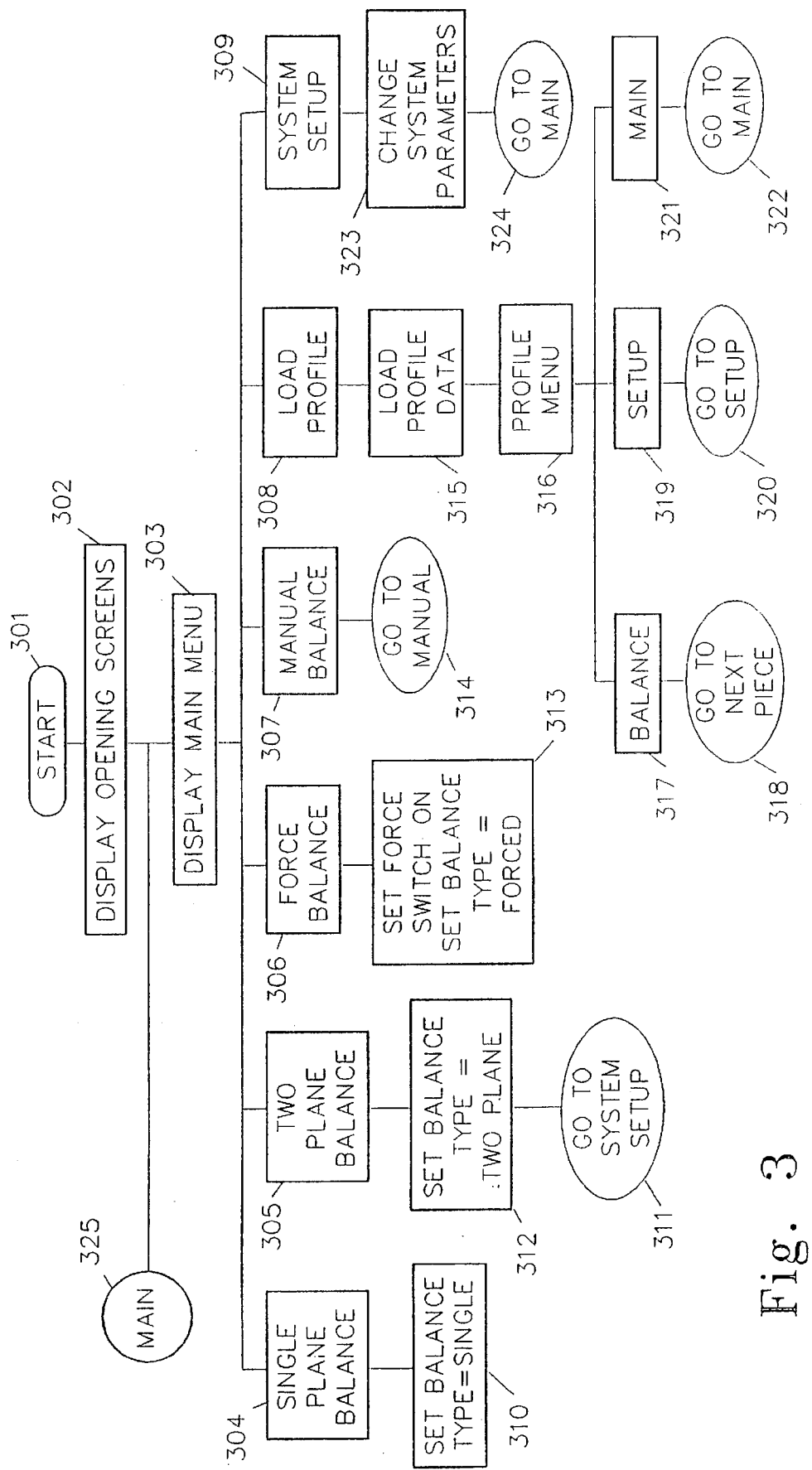
FIG. 3 is a logic flow diagram of the initial operation selection branching of the program.
Figure 4:
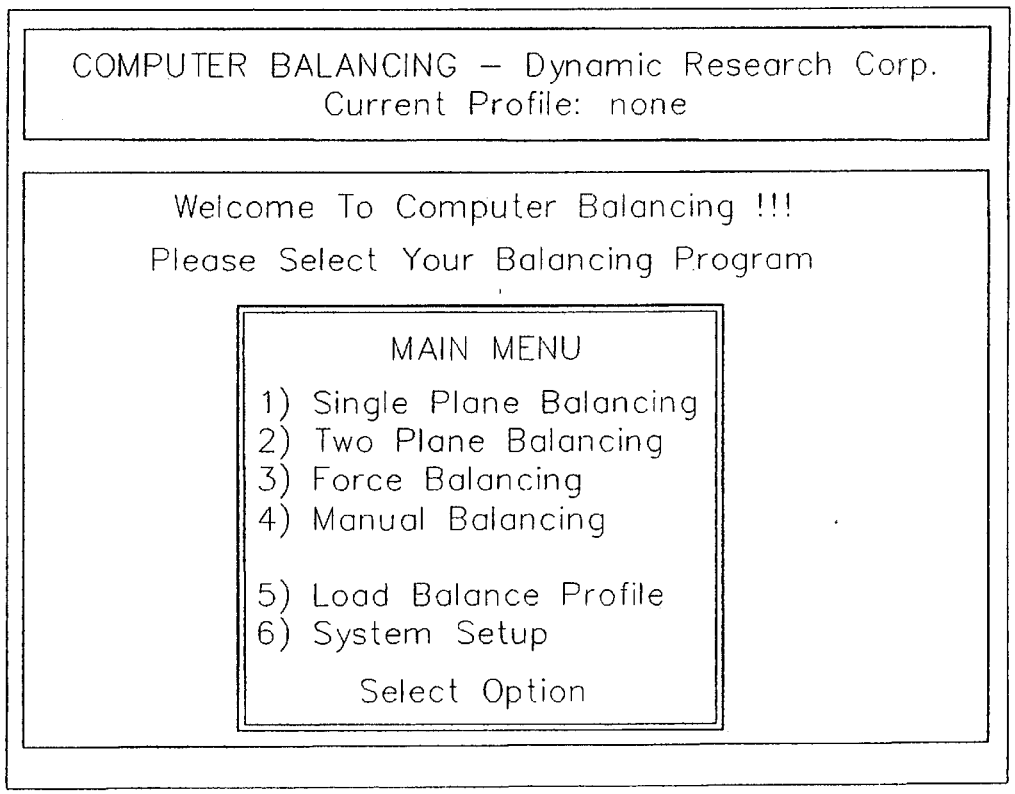
FIG. 4 illustrates the main menu screen for the menu driven balancing system.
Figure 6:
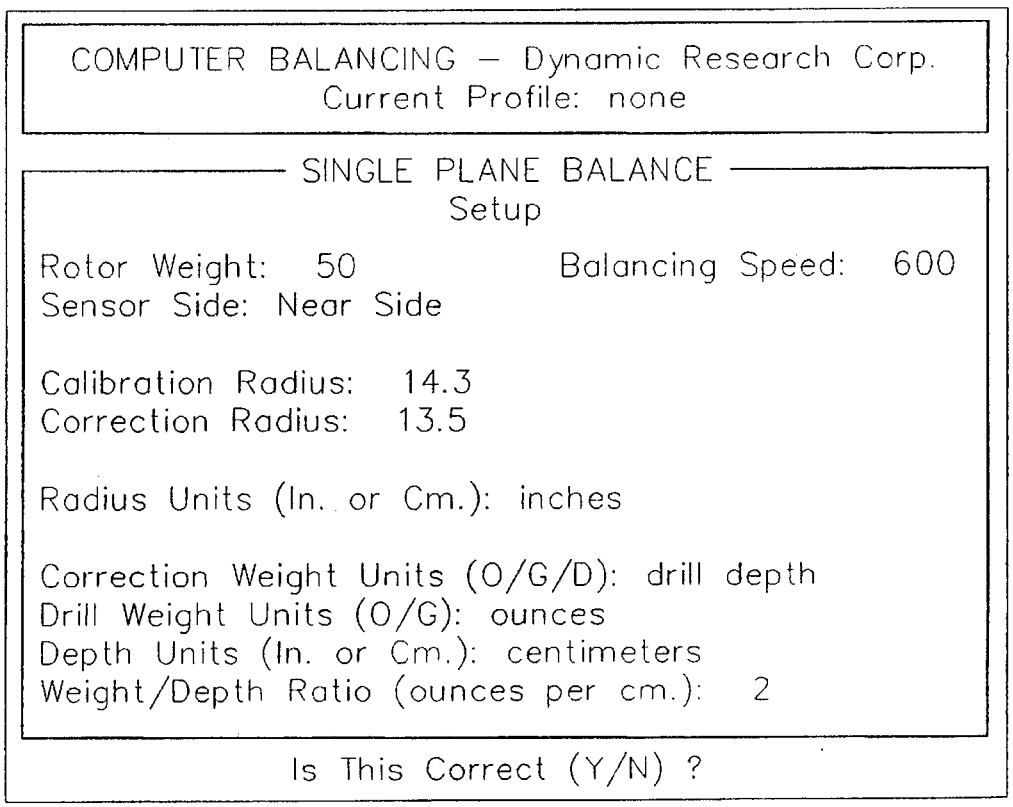
FIG. 6 illustrates the screen containing the menu driven sequences required to set up for Single Plane Balancing.
Figure 5:
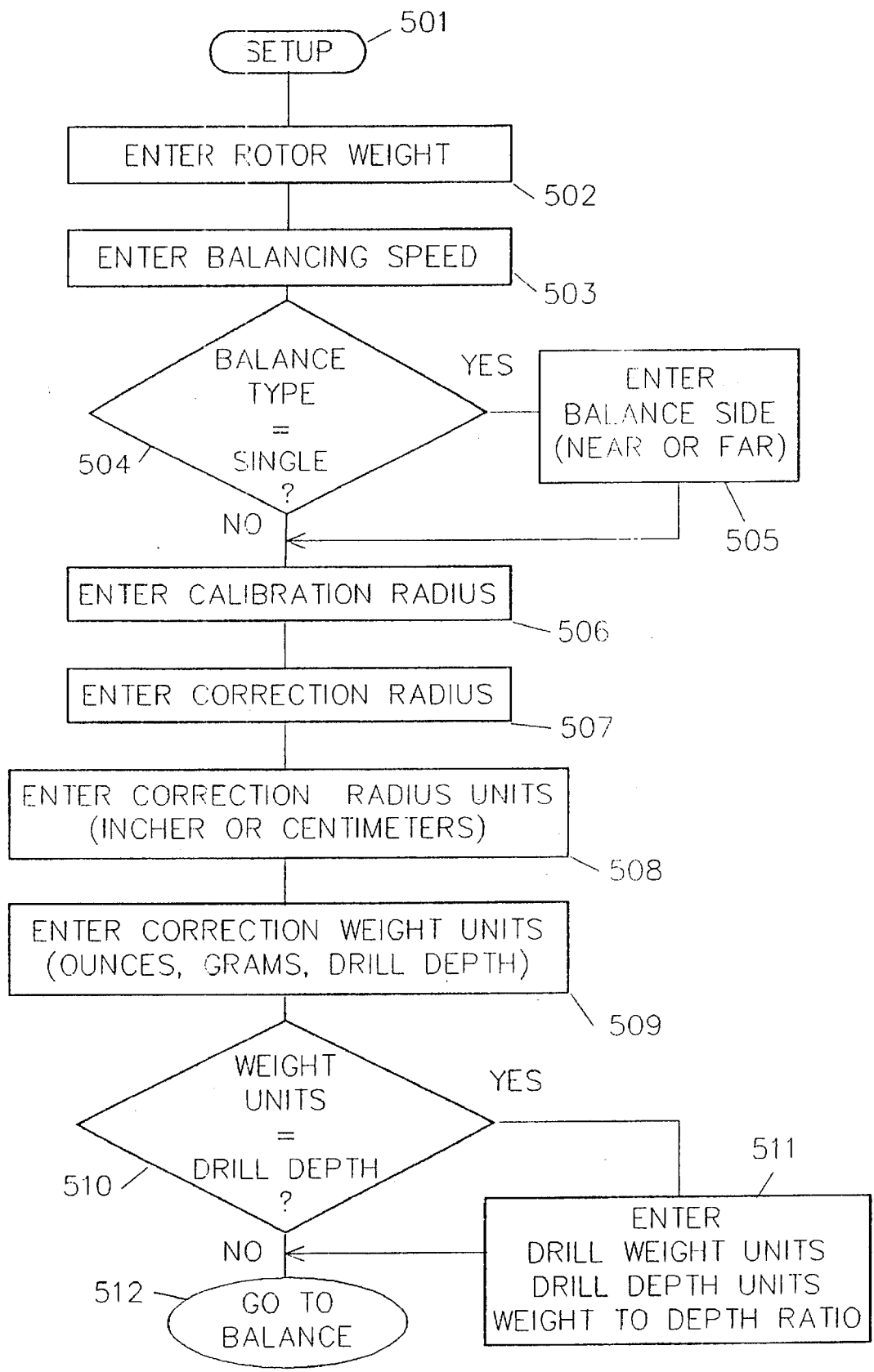
FIG. 5 is a logic flow diagram depicting the operations involved in entering data for calculating the trial weight and its placement.

FIG. 3 illustrates the preliminary steps which begin with the start of the program where immediately after "Start", 301, is initiated, a "Display Opening Screens", 302, is initiated. This routine calls up a main menu screen 303, which is illustrated by FIG. 4. This screen, as are all other screens, is presented on the computer display 18 of Figure. It instructs the user to select an option from among the following: (1) Single Plane Balancing, 304; (2) Two Plane Balancing, 305; (3) Force Balancing, 306; (4) manual Balancing, 307; (5) Load Balance Profile, 308; or (6) System Setup, 309. These six options are depicted as branches springing from the display main menu block, 303, of the logic flow diagram of FIG. 3 where each branch begins with a block corresponding to and captioned like the options displayed in FIG. 4; i.e.: (1) Single Plane Balancing, 304; (2) Two Plane Balancing, 305; (3) Force Balancing, 306; (4) manual Balancing, 307; (5) Load Balance Profile, 308; or (6) System Setup, 309.

Single and Two Plane Balancing are the normally used options but parts that are short in length when compared to their diameter require Force Balancing. Parts like single groove pulleys, propeller type fans, and pump impellers can be very difficult to balance in two planes due to the cross effect caused by the closeness of the correction planes. This is overcome by blending the signals from both pickups into one so that one correction can be made at the center of gravity of the part to obtain the optimum balance for both planes using just one weight. This procedure is limited to parts that rotate less than 3600 RPM and those which have a length to diameter ratio of less than 0.5 (less than ½ if of its diameter in length not counting the shaft extensions).

Figure 9:
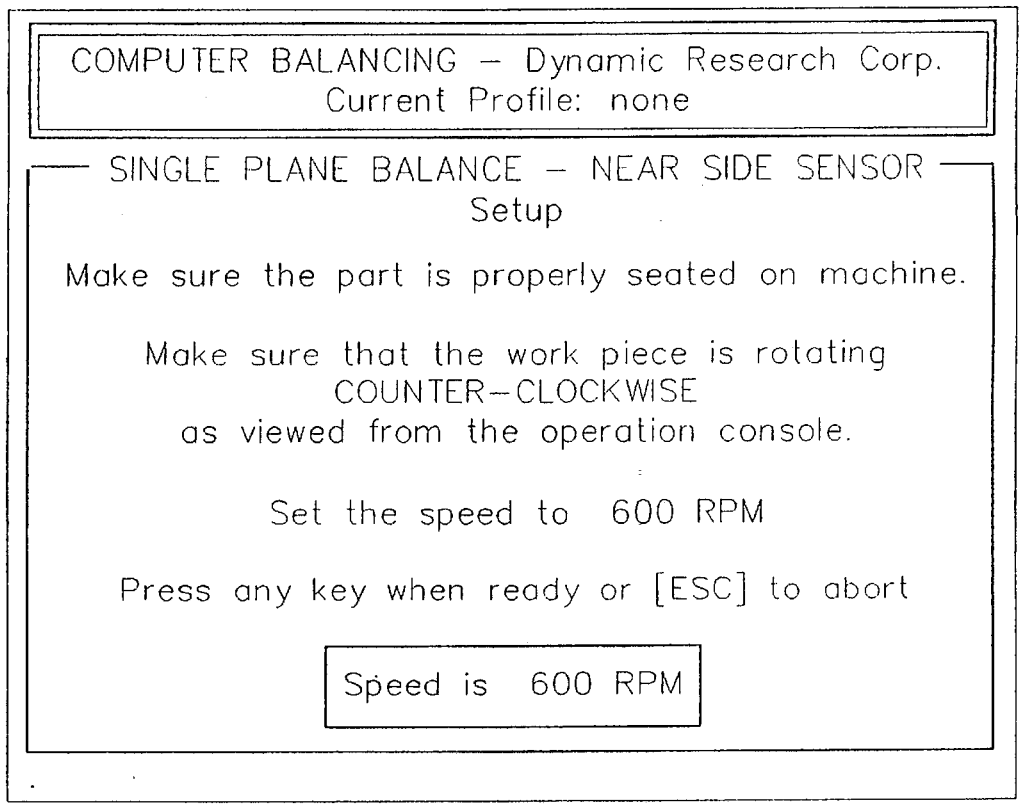
FIG. 9 is an exemplary screen display for a balance set up directing the operator to verify the mechanical configuration and set the rotational speed of the balancing machine.

If Single Plane Balancing, Two Plane Balancing or Force Balancing is selected, the program moves through the set balance type sequences of FIG. 3 wherein for the single plane balance branch type is set to single, 310, for the two plane balance branch the type is set to two plane, 312, and for the force balance branch the force switch is set to on and the type is set to force, 313. After the appropriate setting, the system advances to a "GO TO" routine, 311, and commences with the setup sequence illustrated in FIG. 5 which illustrates the steps carried out during the setup routine for either Single Plane, Two Plane or Force Balancing. These routines initiate an appropriate setup menu screen, FIG. 6, single plane balance; FIG. 7, two plane balance; or FIG. 8, force balance which requires the user to enter the following information as presented in the logic flow diagram of FIG. 5, i.e. rotor weight, 502; balancing speed, 503; balance type, 504; sensor side, 505; calibration radius, 506; correction radius, 507; radius units (IN. or CM.), 508; and correction weight units (O/G/D), 509. If "D", drill depth, is selected, 510, drill weight units, depth units and weight/depth ratio inputs are solicited, 511. As each unit is entered via the supporting computer input keyboard, the display automatically shifts to the next required unit and instructs the operator to enter the appropriate parameter. When all the data required by the appropriate menu screen is input, and proper setup is verified by pressing the "Y" key, the system advances via the "GO TO BALANCE" step 512 and another instruction menu screen is displayed. It directs the operator to verify the mechanical configuration and set the rotor speed. FIG. 9 is exemplary of this screen for a Single Plane Balance setup.

Figure 10:
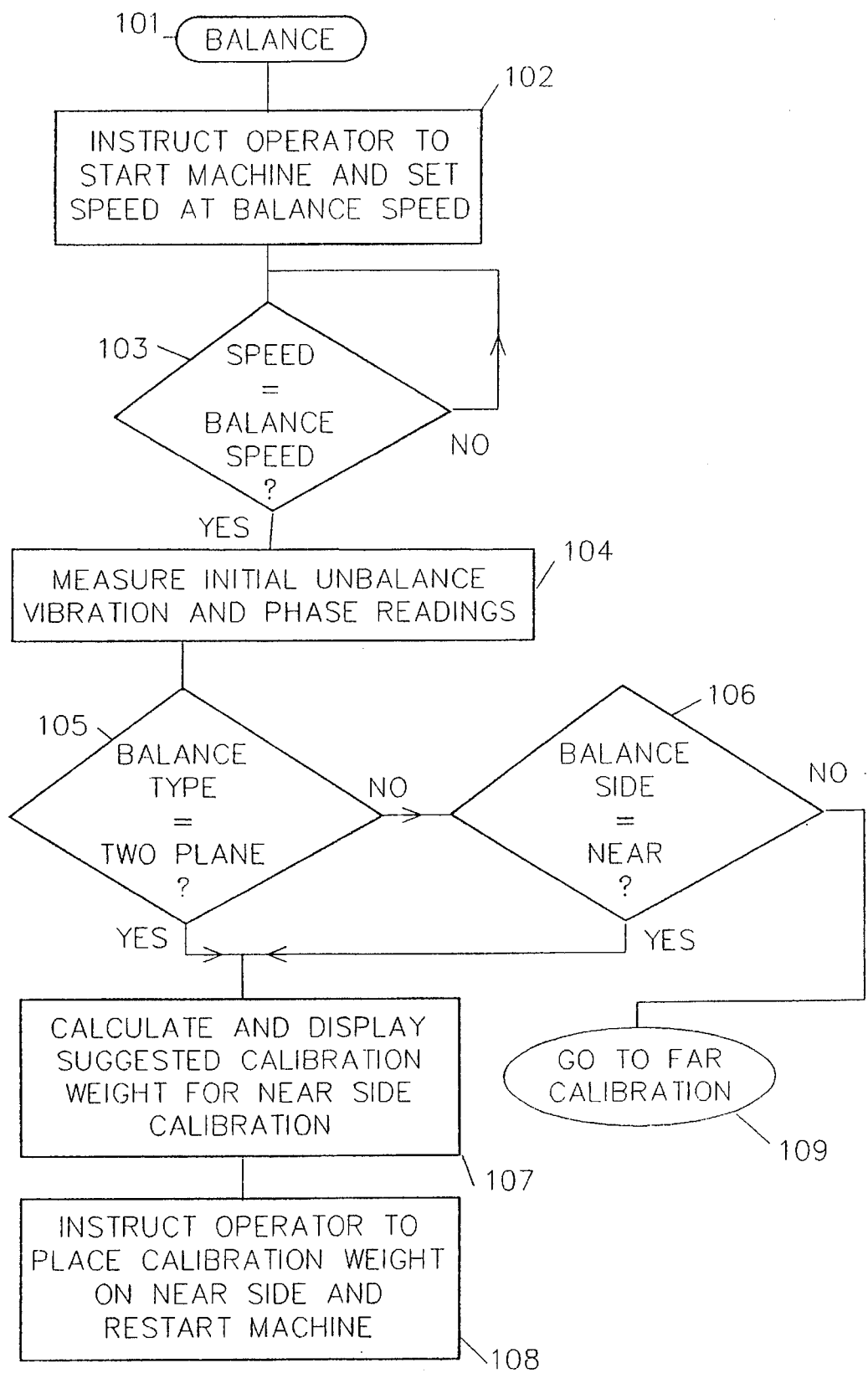
FIG. 10 is a logic flow diagram of the routines involved in producing a suggested trial calibration weight.

The program now moves into the phase illustrated by the logic diagram, "BALANCE", 101 of FIG. 10. During this phase the operator is instructed to start the machine and set the balance speed, 102. As indicated in the logic flow diagram, the speed is monitored, 103, until it equals the set balance speed after which the initial unbalance vibration and phase readings are measured, 104, and the program determines if the type of balance is two plane, 105. The output of the balance type query advances the program to a balance side query, 106, or a calculate and display operation for near side calibration, 107. If the progression is to the near side calibration 107, the operator is instructed to place the calibration weight on the near side and restart the machine, 108. If the progression is to step 106 and the SIDE query is yes for near, the 107 and 108 steps are executed as discussed above. If the answer is no, the far side calibration 109 is performed in the same fashion as for the near side.

Figure 11:
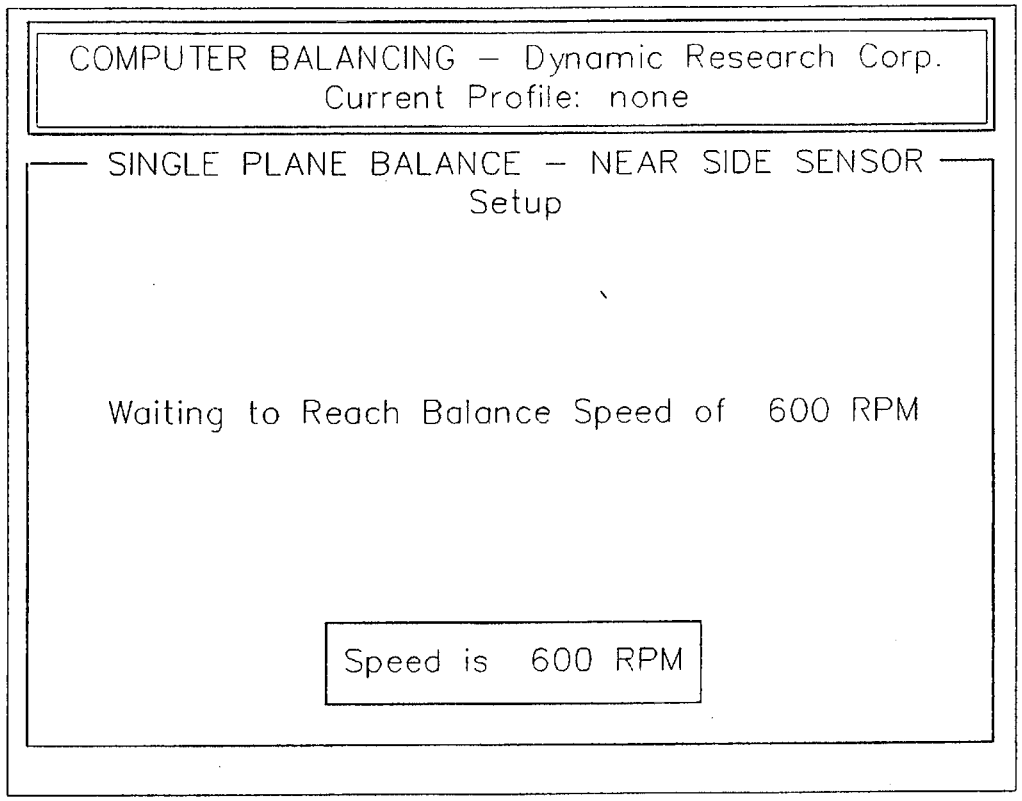
FIG. 11 illustrates the advisory message given by the computer to the operator that the system is waiting to reach balancing speed.
Figure 12:
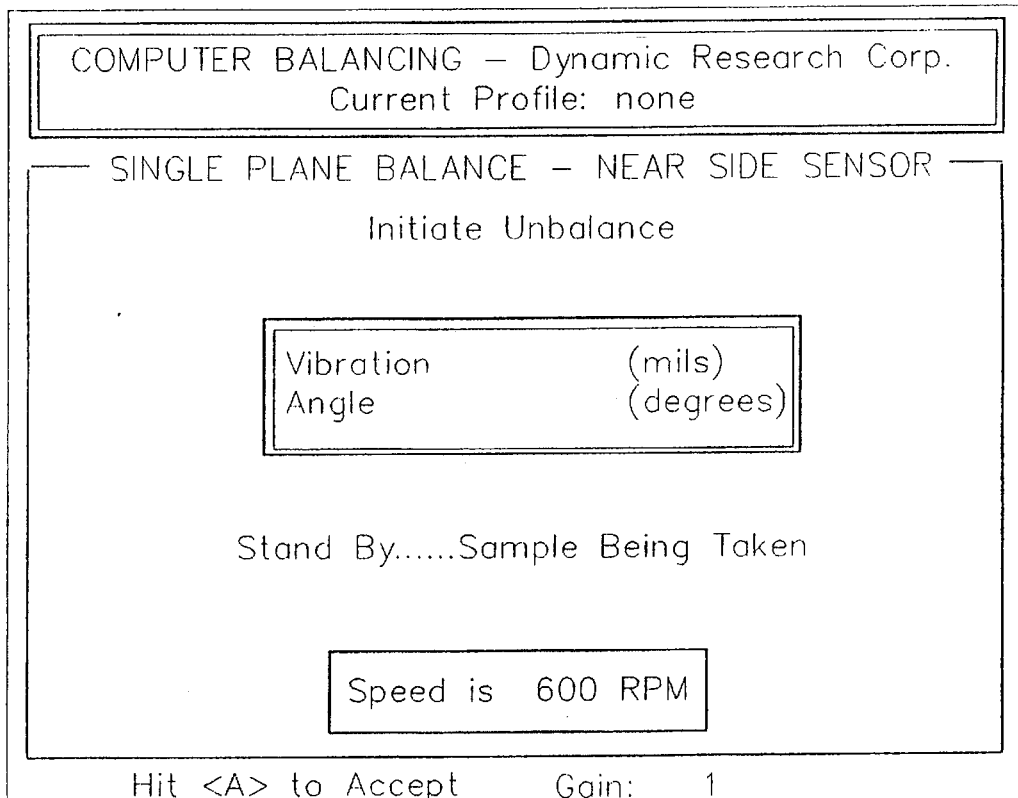
FIG. 12 illustrates the computer screen display advising the operator that the machine has reached balance speed and samples are being taken.
Figure 13:
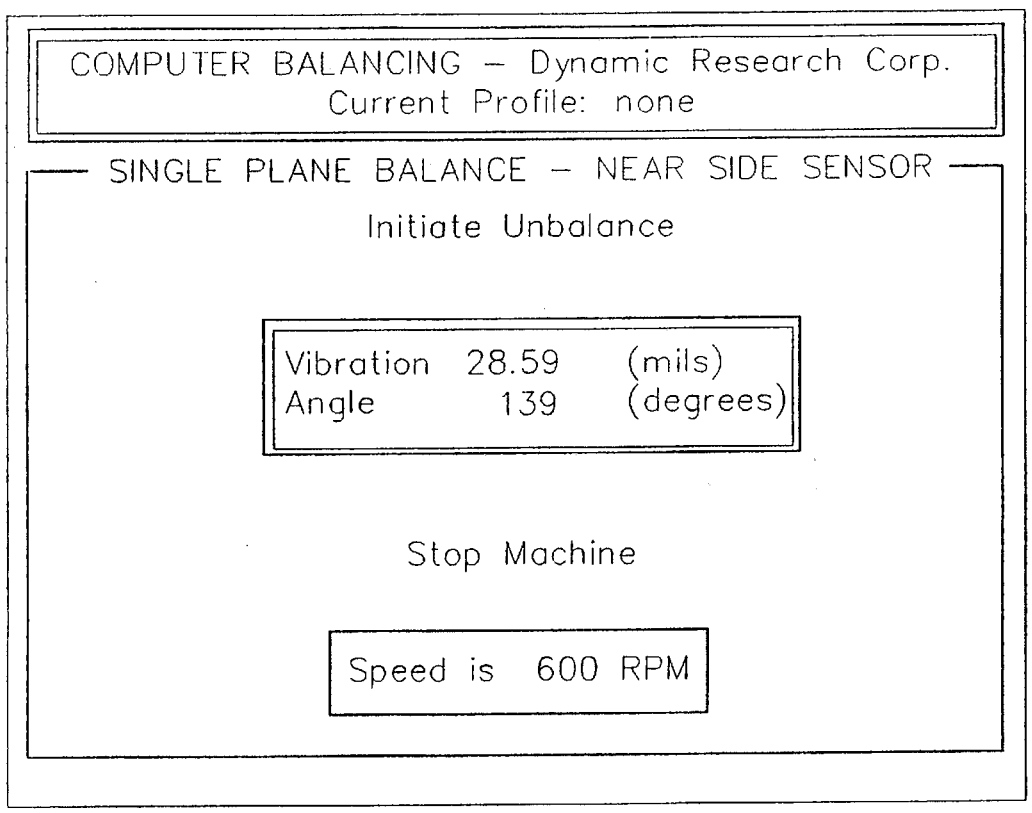
FIG. 13 is a facsimile of the screen presentation directing the operator to stop the machine after the samples have been taken.

When the parameters have been set and accepted as indicated by the operator striking a key, the screen flashes a waiting to reach balance speed as indicated in FIG. 11. When balance speed is achieved, the message is followed by a screen display which advises "Stand By . . . Samples Being Taken" as illustrated in FIG. 12. After the samples are taken, the operator is instructed to stop the machine, FIG. 13. This is followed by the display of FIG. 14 which requests confirmation that the suggested calibration weight is being used or the weight of the operator substituted weight. When the weight is accepted, the operator is asked to verify or substitute the placement angle as illustrated in FIG. 15. As soon as the angle is accepted, the calibration setup screen is displayed, FIG. 16. This screen provides the calibration weight and placement data. The operator confirms the setup and the program advances.

Figure 17:
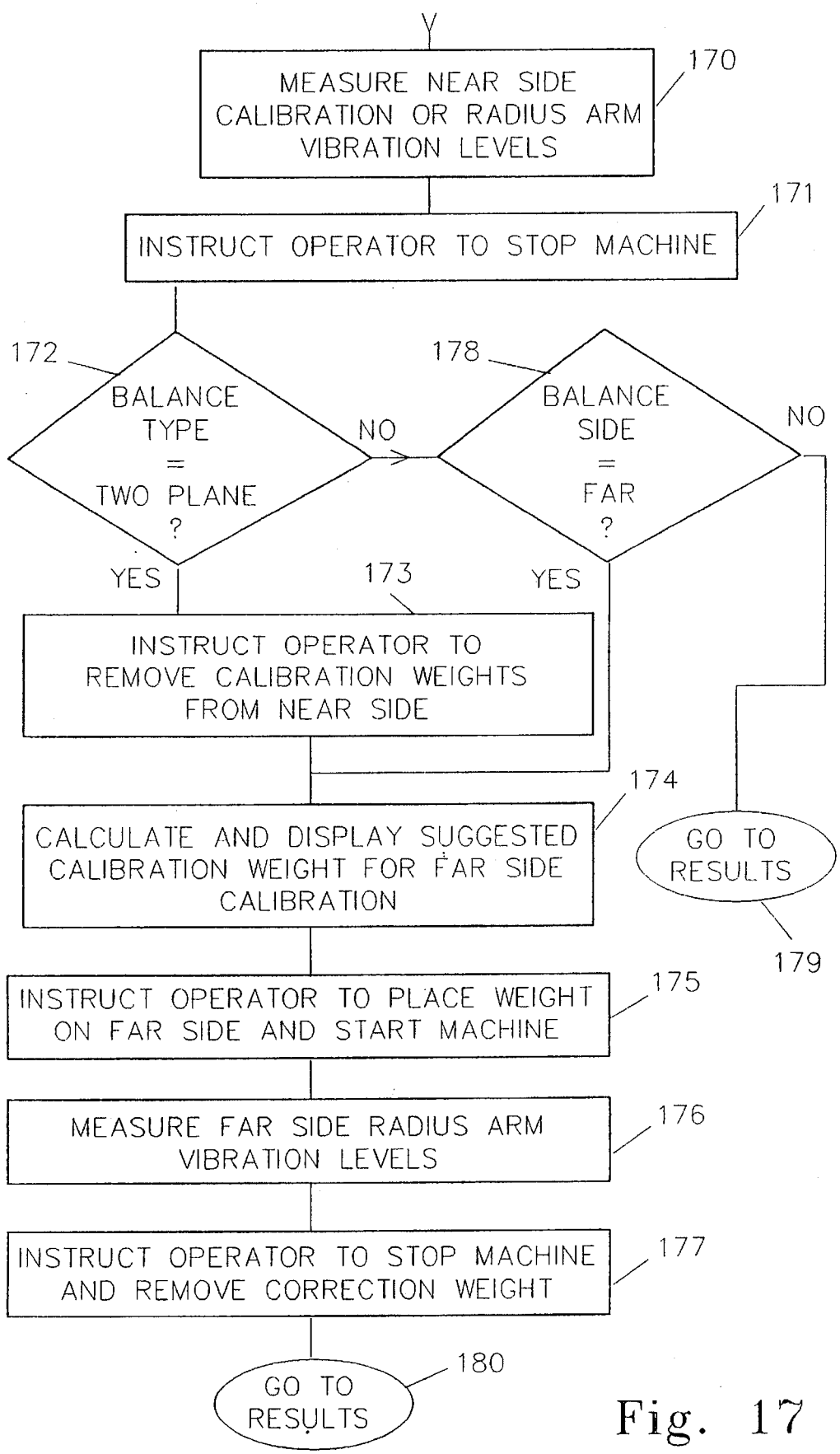
FIG. 17 is a logic flow diagram illustrating the program sequences required to measure the work piece vibration levels.
Figure 19:
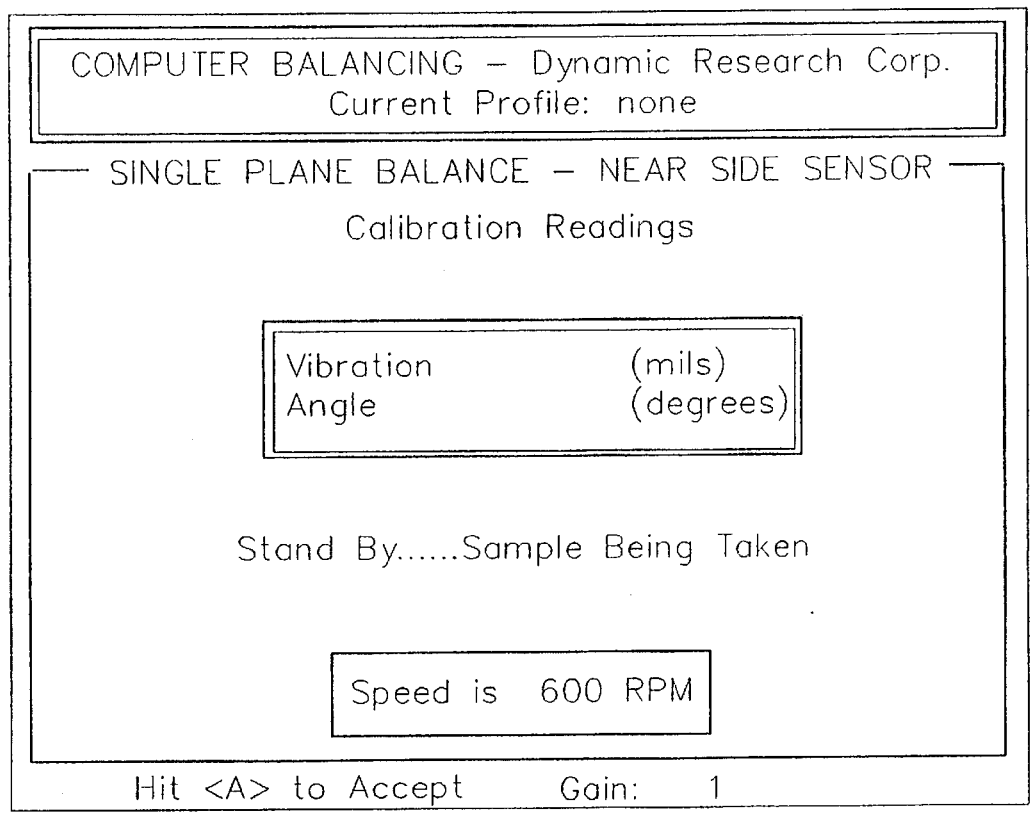
FIG. 19 is a facsimile of the screen which advises the operator that balance speed has been reached and samples are being taken.
Figure 20:
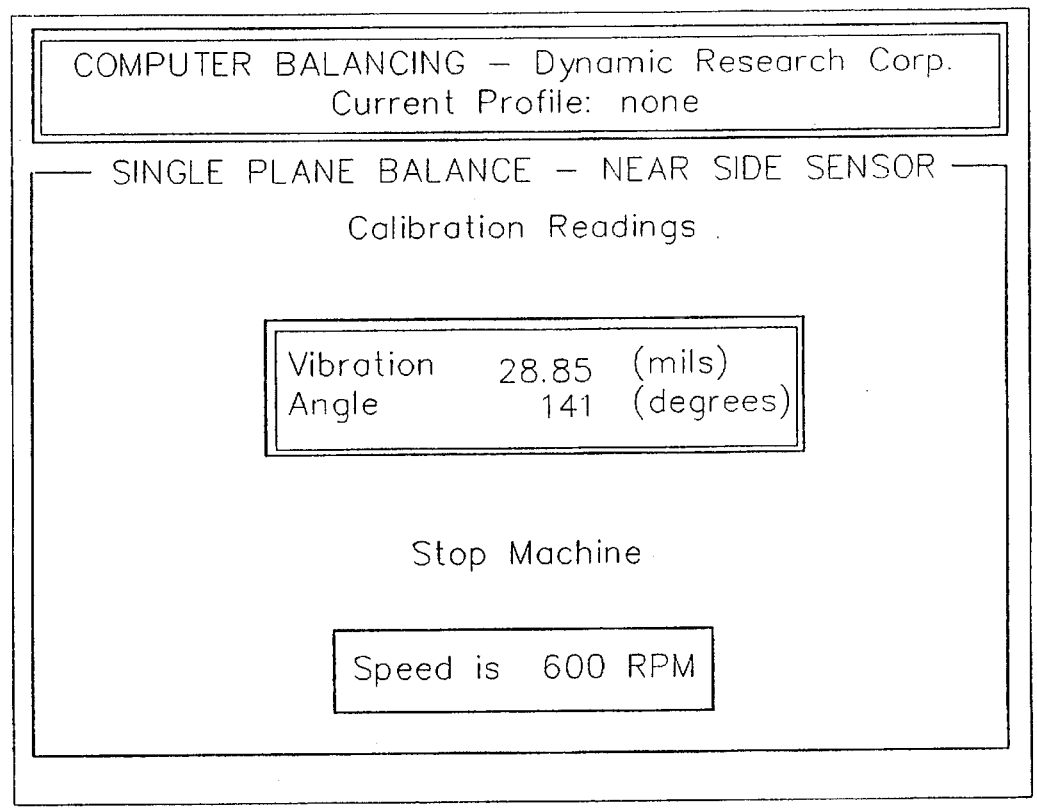
FIG. 20 is the menu driven screen advising the operator that samples have been taken, the results of the samples and instructing the operator to stop the machine.

When the calibration setup is acknowledged by striking the "Y" key as directed in FIG. 16, the program advances to the routines of FIG. 17. These routines commence with a measurement of the near side calibration or radius arm vibration levels 170 as indicated at the top of the logic flow diagram. Once the measurement is made, the operator is instructed to the stop the machine, 171, and a balance type query, 172, is made. If it is a two plane type of balance, the operator is instructed to remove the calibration weights from the near side, 173. If it is not a two plane balance type, a query is made as to whether or not the balance is the far side, 178. If it is not, the program advances to results, 179 as presented by the logic diagram illustrated in FIG. 22. If it is the far side, the system calculates and displays the suggested calibration weight for the far side calibration, 174. Next, the operator is instructed to place the weight on the far side and start the machine as indicated by step 175 in the logic flow diagram of FIG. 17. Once the machine is started, the far side radius arm vibration levels are measured, 176, and the operator is instructed to stop the machine and remove the correction weight, 177. The program then advances, 180, to the "RESULTS", 220, logic flow diagram of FIG. 22. While the processes of FIG. 17 are occurring, the displays of FIGS. 17 through 21 are presented. The flashing message of FIG. 18 advises the operator that the system is waiting to reach the required balance speed. Once the balance speed is reached, the flashing message changes to the stand by message of FIG. 19 until the sample is taken. The operator is then instructed to stop the rotation, FIG. 20. When the machine is stopped, the operator follows the instructions of the next screen, FIG. 21, by removing the weights.

Figure 22:
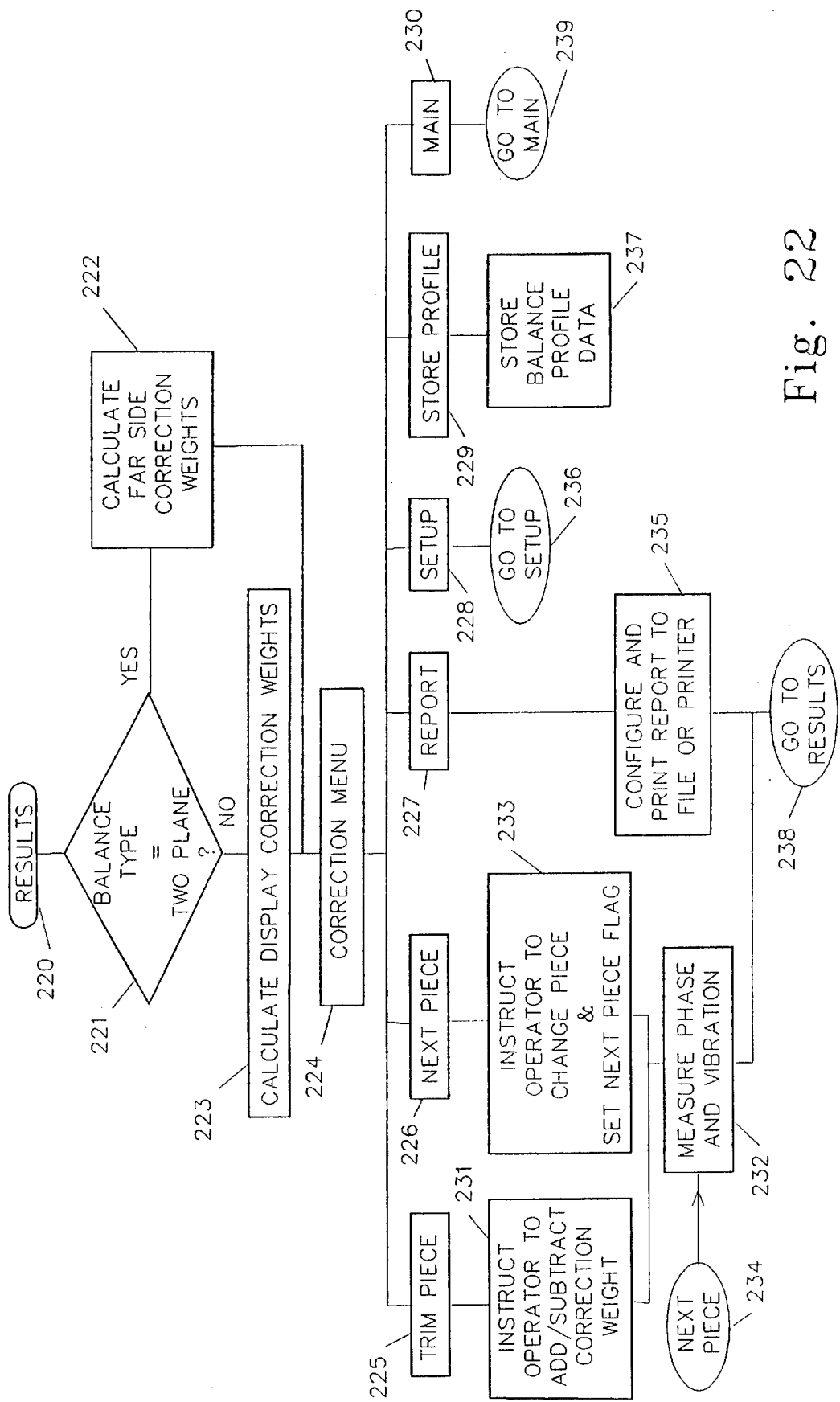
FIG. 22 is a logic flow diagram illustrating the routines required to calculate and display the correction weight values and branch the program to a selection of subroutines.
Figure 24:
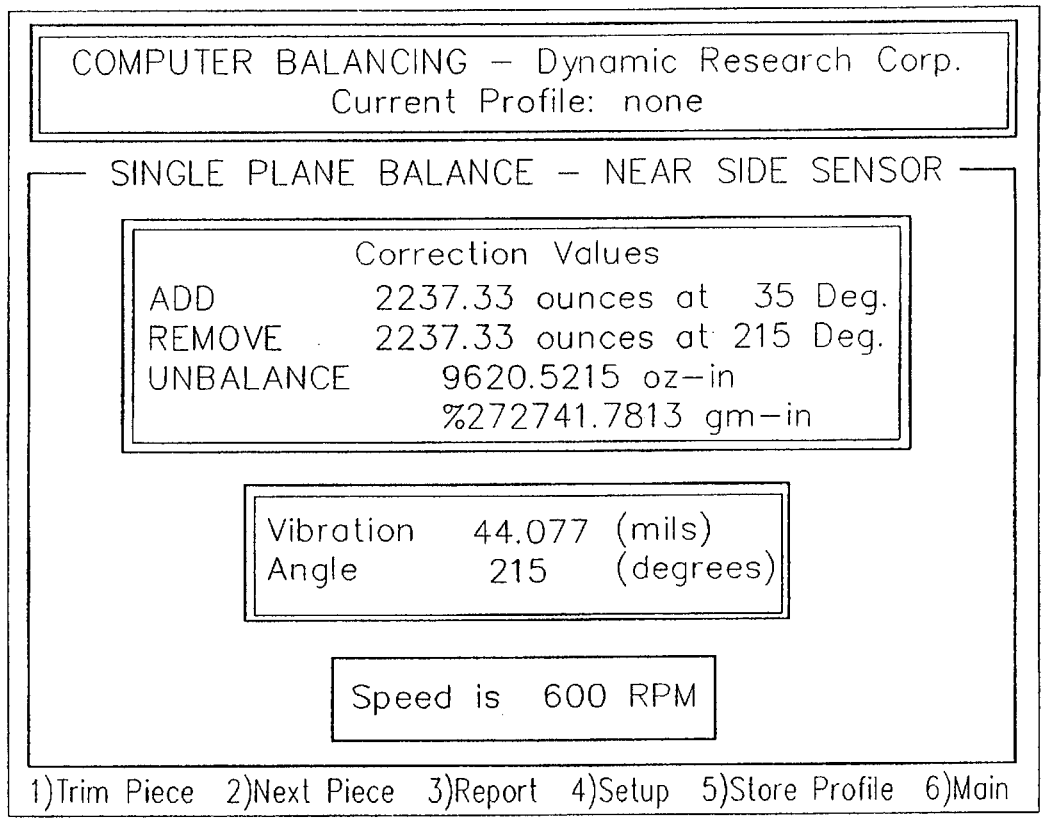
FIG. 24 is the final correction screen created by the logic illustrated in FIG. 22 presenting the correction values in terms of weight to be added or alternately removed and the location of the addition or removal and instructing the operator to select a branching subroutine.

After the test weight is removed, the operator strikes any key and the program calculates the required correction as indicated in FIG. 22. In the logic flow diagram of FIG. 22, the first query 221 determines whether or not a two plane balance is being performed. If the answer is yes, the far side correction weights are calculated, 222. If the answer is no, the routine moves on to calculate and display the correction weights required, 223. The results, the amount and location of the correction required to balance the work piece, are displayed in the screen illustrated by FIG. 23 if the drill depth option was selected on the display screen illustrated by FIG. 6. In FIG. 23 a drill depth and drill location are provided. If an option other than drill depth was selected on the FIG. 6 screen, the correction values displayed at this point in the program are weight to be added at a location and the alternate correction of weight to be removed from a location as illustrated in FIG. 24. After making the corrections, the operator starts the machine and chooses the trim option from the menu at the bottom of the screen. This occurs as an advancement in the logic flow diagram of FIG. 22 wherein from the correction menu block, 224, the program is advanced by operator selection to one of six alternatives, i.e.: trim piece, 225; next piece, 226; report, 227; setup, 228; store profile, 229; or main, 230.

The number of options are listed at the bottom of the final screen. The first, 1) Trim Piece, is selected after the balance run. This directs that the operator be instructed to add or subtract correction weights, 231, and causes the computer to take new readings to see if the balance was corrected to a reasonable tolerance or if additional balancing is required as dictated by completion of the measure phase and vibration step 232 of the logic flow diagram of FIG. 22. The display flashes through the run messages previously discussed and returns to the display of FIG. 23 to indicate if additional correction is required.

When the proper balance condition is reached, 2) Next Piece, 226 of FIG. 22, may be selected from the bottom of the screen illustrated by FIG. 23 to balance the next identical part without weight calibration runs. In this instance, the logic flow diagram of FIG. 22 goes from correction menu, 224, to next piece, 226, after which the operator is instructed to change the piece and set the next piece flag, 233. Then the next piece routine, 234, continues by repeating the operations dictated by the phase and vibration measurement step. If a report is desired, the operator selects "3) Report", 227 of FIG. 22, which will produces a menu for selecting: 1) Print Report; 2) Save Report; 3) Change Report Information; and 4) Return. If Print Report is selected, a report similar to FIG. 25 is produced, 235. Selecting Save Report stores the data so the report can be printed at a later time. Change Report Information allows the operator to change job and operator data but not balance data. Return returns the last final screen, FIG. 23.

From the correction menu, 224, of logic diagram FIG. 22, the operator may select setup, 228, after which the system returns to setup, 236, and proceeds along the procedures dictated in the logic diagram FIG. 3. Alternately, an operator may elect to store the profile. Selection of store profile, 229, results in the balance profile data being stored, 237, and the program advancing to results, 238. The final option of the correction menu, 224, is "MAIN", 230, which causes a return to the main menu, 239, and subsequent proceeding in accordance with the logic diagram of FIG. 3.

The other balance runs use similar screens with different identification displays, i.e., FAR SIDE SENSOR, TWO PLANE BALANCE, FORCE BALANCE, etc. When Two Plane Balancing is being performed, duplication is required to accommodate calculations for both sides but the dual data is displayed on a common screen. Two Plane and Force Balancing is performed in a manner similar to that described for Single Plane Balancing so a step-by-step presentation is not provided to avoid repletion.

In the manual mode the system provides information on the amount (Mils) of vibration and Phase Angle (Degrees), at the bearing planes, on each end of the work piece, in the manual mode of operation. It is possible to balance in this program using the old fashioned "Vector Method" of balancing. This data, which is free from computer manipulation, is also used for studying the dynamics of a rotor in motion or for performing whip control balancing on long flexible rolls.

Figure 26:
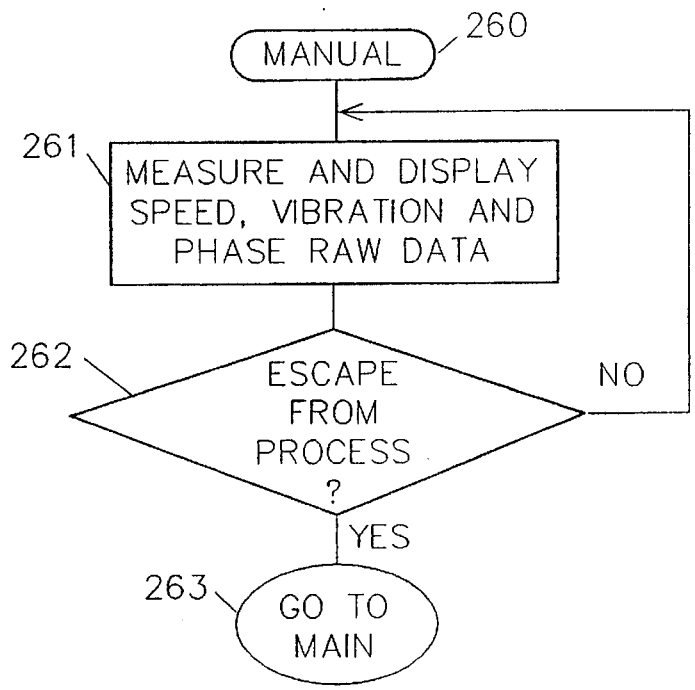
FIG. 26 is a logic flow diagram of the program steps involved in manual balancing.
Figure 27:
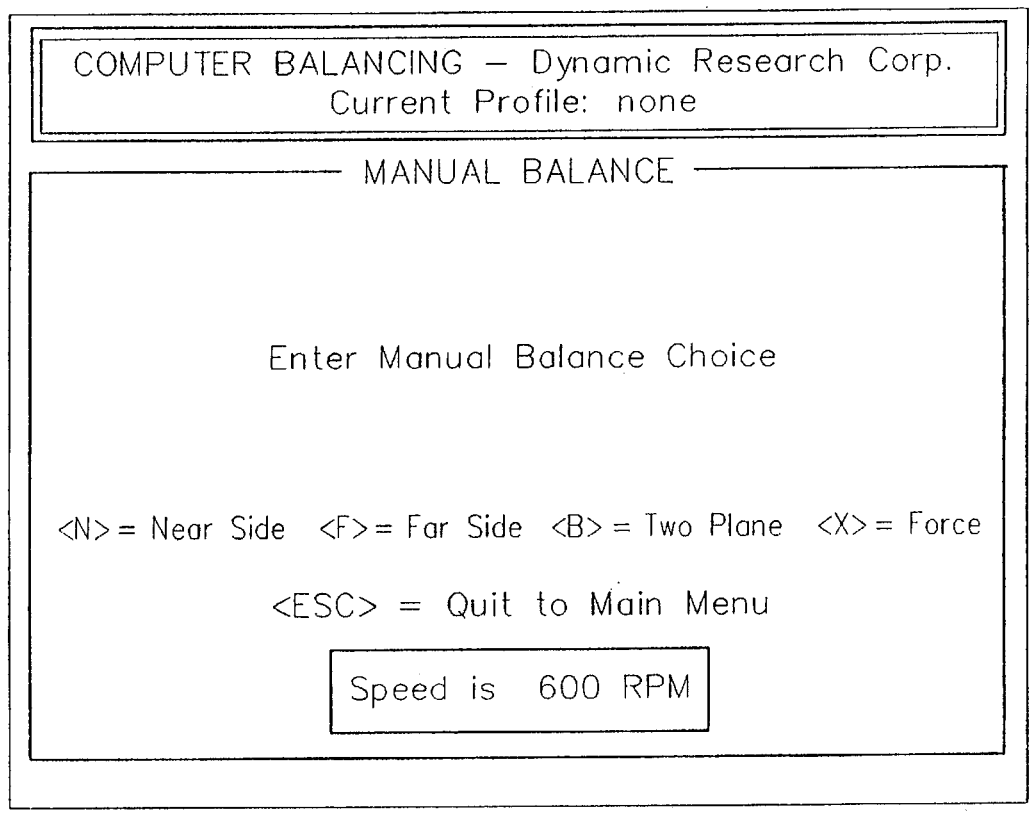
FIG. 27 is a facsimile of the manual Balance selection screen which allows the operator to choose the type of manual Balancing to be performed.
Figure 28:
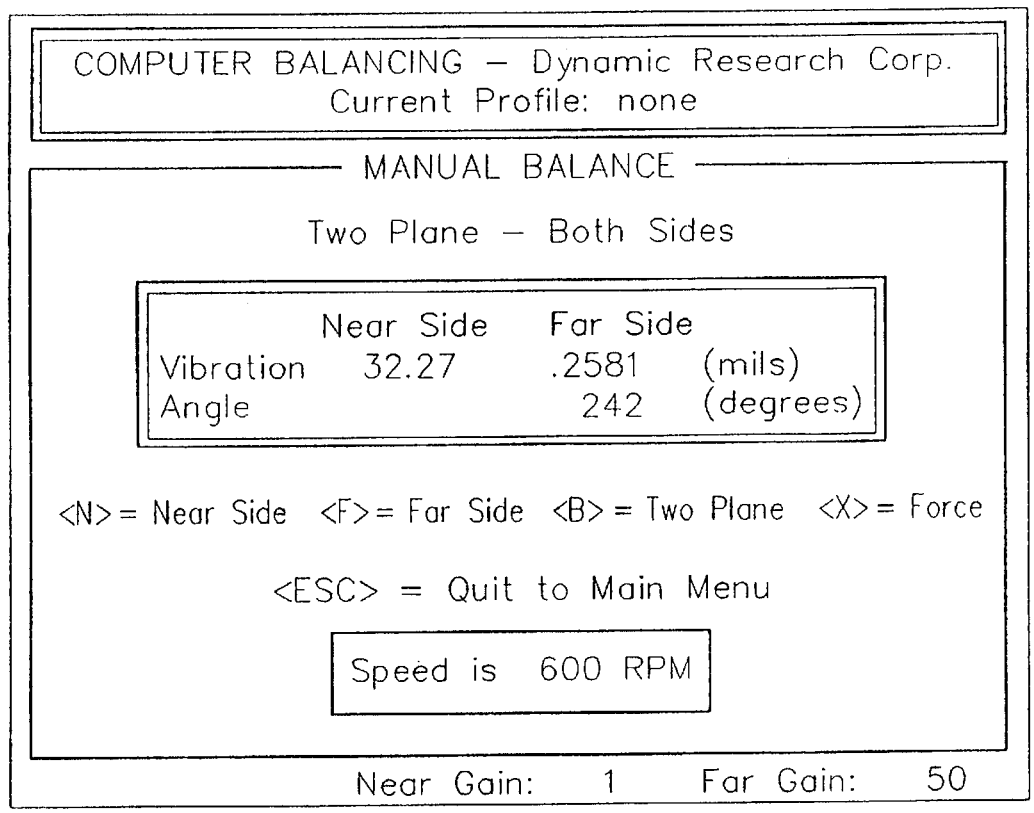
FIG. 28 illustrates the screen presentation advising the operator of the vibration and critical angle of the work piece during manual Balancing.

If Manual Balancing is selected when the main menu of FIG. 4 is displayed, the system goes to the Manual Balance routine of FIG. 3 which moves the program into "MANUAL", 260, illustrated by FIG. 26. In this mode, a screen, FIG. 27, directs the user to select: Near Side, Far Side, Two Plane or Force and speed, vibration and phase raw data are measured and displayed, 261, i.e.: When a selection is made, vibration in mils and angle in degrees is presented on the CRT. The same information is presented in this screen for near or far side or Force but the display distinguishes which side is selected. When Two Plane is selected, both near and far side vibration and angle information is presented, see FIG. 28. Note that the gain used in each side computation is listed on the bottom of the screen. The manual routine of FIG. 26 includes a query step 262 which allows a recycle through the measure and display step 261 or a return to the main menu, 263.

Figure 29:
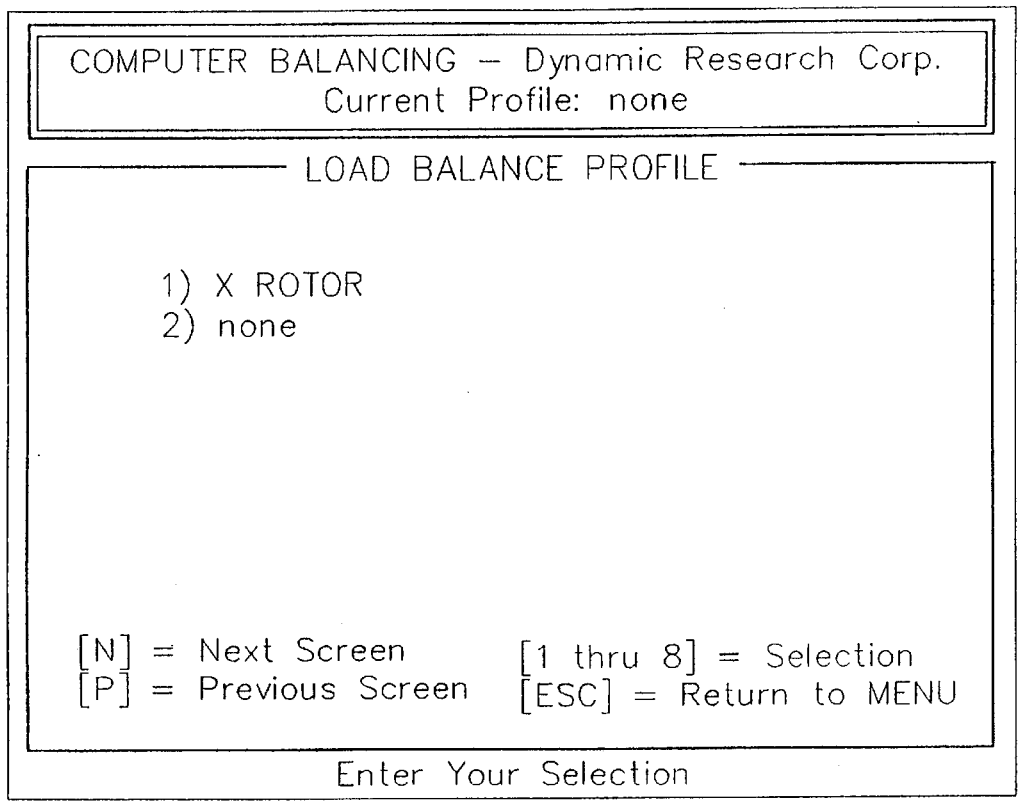
FIG. 29 is the Load Balance Profile display provided when an operator elects to use stored balanced data.
Figure 30:
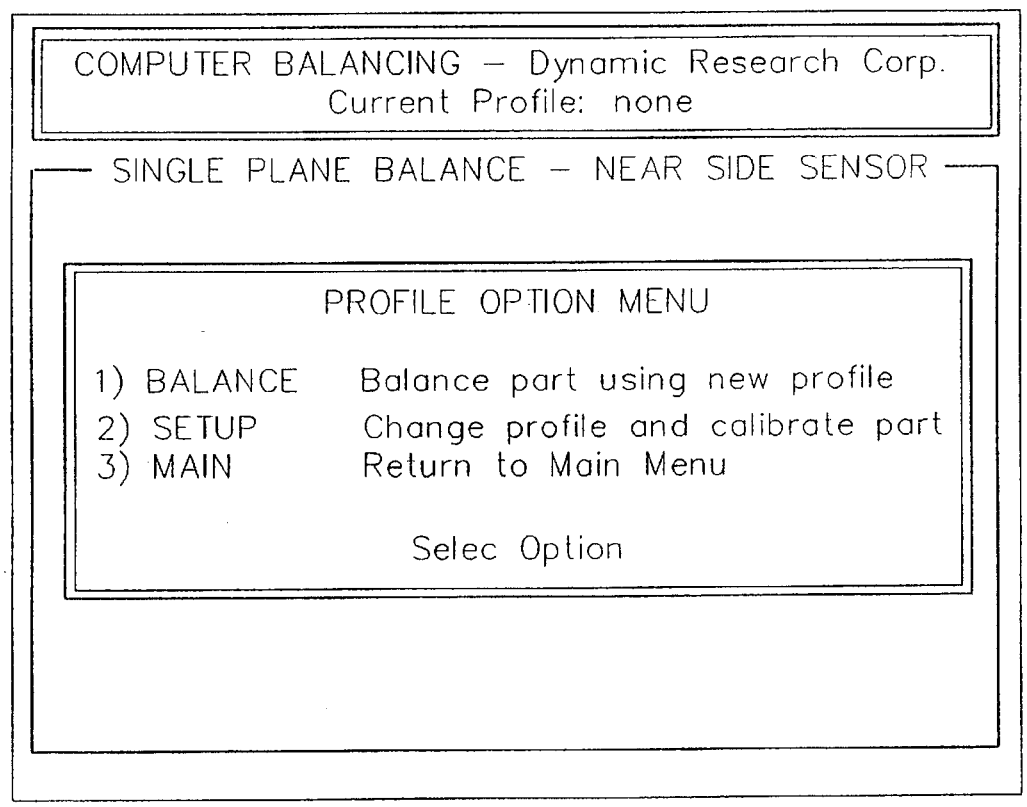
FIG. 30 is the operator options displayed after a balance profile has been selected for use.

When Load Balance Profile is selected on the Main Menu, load profile data is accessed and the Load Balance Profile option list menu, FIG. 29, is displayed. When a menu option is selected, the profile menu option screen, FIG. 30, is presented, allowing an operator to balance the work piece based on the stored data or change the setup. If option 1) BALANCE is selected, the program jumps to the routines of FIG. 22 and the displays of FIGS. 18, 19 and 20 flash on the screen to be followed by the correction values display, FIGS. 23 or 24.

The system setup routine entered through the main menu of FIG. 4 enables the user to set up a user name and address to be automatically printed on output reports; the machine model and serial number; the system and data file paths; a system password to ensure security; and set hardware calibration values.

While preferred embodiments of this invention have been illustrated and described, variations and modifications may be apparent to those skilled in the art. Therefore, we do not wish to be limited thereto and ask that the scope and breadth of this invention be determined from the claims which follow rather than the above description.

What is claimed is:

1. An apparatus for balancing a work piece, comprising:
   support bearings for said work piece;
   means for entering into said apparatus a desired balancing speed for said work piece;
   means for rotating said work piece in said support bearings at said desired balancing speed;
   means for generating digital data representing the magnitude and phase of vibrations of said work piece in the planes defined by said support bearings; and
   a program driven computing device for providing work piece balancing weight values and weight placement in response to said digital data and operator inputs.

2. A balancing apparatus as defined in claim 1, wherein said operator inputs include said desired balancing speed and correction radius.

3. A balancing apparatus as defined in claim 2, wherein said program driver computing device includes a display means for presenting interactive menu driven balancing instructions in the form of screen displays generated by said program.

4. A balancing apparatus as defined in claim 3, wherein one of said screen displays directs the operator to input to said program driven computing device:
   said desired balancing speed, near side correction radius, and far side correction radius.

5. A balancing apparatus as defined in claim 3, wherein one of said screen displays advises the operator that the program is waiting for the work piece to reach a preset balance speed of rotation.

6. A balancing system as defined in claim 3, wherein one of said screen displays advises the operator of the acceptance of said digital data representing the magnitude and phase of vibrations of said work piece in the planes defined by said support bearings and instructs the operator to stop the rotation of the work piece.

7. A balancing apparatus as defined in claim 3, wherein one of said screen displays advises the operator of the balance weight to be added to the work piece, a side of the work piece on which said balance weight is to be placed, and the radius on which said balance weight is to be placed.

8. A balancing apparatus as defined in claim 1 wherein said means for generating digital data representing the magnitude and phase of vibrations of said work piece in the planes defined by said support bearings comprises:
   a vibration responsive transducer for each of one or more work piece support bearing planes;
   an automatic multi-gain amplifier for each of said vibration responsive transducers;
   each of said automatic multi-gain amplifiers connected to an output of a different one of said vibration responsive transducers;
   an integrator for each of said automatic multi-gain amplifiers;
   each of said integrators connected to an output of a different one of said automatic multi-gain amplifiers;
   an adjustable bandpass filter for each of said integrators;
   each of said adjustable bandpass filters connected to an output of a different one of said integrators;
   a peak detector for each of said adjustable bandpass filters;
   each of said peak detectors connected to an output of a different one of said adjustable bandpass filters;
   a phase detector for each of said adjustable bandpass filters;
   each of said phase detectors connected to an output of a different one of said adjustable bandpass filters;
   a mark sensor for producing a signal in response to a predetermined rotation of said work piece;
   a zero position detector driven by an output of said mark sensor for producing output pulses at a frequency which is a function of the rotational frequency of said work piece;
   means responsive to said zero position output pulses for setting the center frequency of said adjustable bandpass filters equal to the rotational frequency of said work piece;
   an analog-to-digital converter for producing digital data representing the output of each of said peak detectors;
   means for supplying the output of said analog-to-digital converter to an input port of said program driven computing device;
   means for producing clock pulses;
   a counter incremented by said clock pulses until inhibited by an output of one of said phase detectors;
   means for supplying the contents of said counter to an input port of said program driven computing device;
   means responsive to an output of said zero position detector for resetting said counter.

9. A balancing apparatus as defined in claim 8, comprising means to connect the outputs of a plurality of said vibration responsive transducers to a common one of said automatic multi-gain amplifiers.

10. A centrifugal balancing apparatus, comprising:

supporting bearings;

means for rotating in said support bearings, a work piece to be balanced at an angular velocity predetermined to be within an optimum range for centrifugally balancing said work piece;

mark sensing means for determining when said work piece is rotated to a predetermined orientation;

vibration sensing means for providing signals representing a magnitude of vibration of the work piece in the planes of said supporting bearings;

an electronic interface means for converting outputs of said mark sensing means and said vibration sensing means into digital data representing vibration magnitude and phase; and a computer for calculating a balance weight location on said work piece based on said digital data.

11. A balancing apparatus as defined in claim 10 wherein said electronic interface means comprises:

an automatic multi-gain amplifier for amplifying signals from said vibration sensing means as a function of their amplitude;

an integrator for integrating an output of said multi-gain amplifier;

a variable bandpass filter for filtering an output of said integrator;

a zero crossing detector responsive to an output from said mark sensing means for producing a signal indicating when said work piece has rotated to a predetermined position;

said zero crossing detector providing an input signal to said variable bandpass filter for setting said variable bandpass filter's center frequently to said work piece's frequency of rotation;

a peak detector for determining when an analog output of said variable bandpass filter is maximum;

said peak detector providing a feedback signal to synchronize said integrator;

a phase detector for determining zero crossing of an output of said variable bandpass filter;

an analog-to-digital converter for converting a DC level detected by said peak detector into an equivalent digital signal;

a counter;

means for incrementing said counter;

means responsive to an output of said phase detector for stopping said counter; and means for resetting said counter in response to an output of said zero crossing detector.

12. A balancing apparatus as defined in claim 10, comprising:

a printer for producing reports of balancing operations at the direction of said computer for calculating a balance weight location on said work piece based on said digital data.

13. A computer implemented method of balancing a work piece, comprising the steps of:

entering a balance speed into said computer;

entering a trial weight and angle into said computer;

rotating said work piece at said balance speed;

detecting magnitude and phase of vibrations of said rotating work piece;

entering said detected magnitude and phase of vibrations into said computer;

calculating, in said computer, a weight placement of said trial weight from said balance speed and said detected magnitude and phase of vibration, said computer providing said calculated weight placement to an operator; and balancing said work piece by a trial weight adjustment and placement in response to information provided by said computer.

* * * * *